(12) United States Patent
Karpoff

(10) Patent No.: US 7,299,290 B2
(45) Date of Patent: Nov. 20, 2007

(54) METHOD AND SYSTEM FOR PROVIDING MULTIMEDIA INFORMATION ON DEMAND OVER WIDE AREA NETWORKS

(75) Inventor: Wayne T. Karpoff, Sherwood Park (CA)

(73) Assignee: YottaYotta, Inc., Kirkland, WA (US)

( * ) Notice: Subject to any disclaimer, the term of this patent is extended or adjusted under 35 U.S.C. 154(b) by 973 days.

(21) Appl. No.: 09/815,824

(22) Filed: Mar. 22, 2001

(65) Prior Publication Data

US 2001/0049740 A1     Dec. 6, 2001

Related U.S. Application Data

(60) Provisional application No. 60/191,237, filed on Mar. 22, 2000.

(51) Int. Cl.
*G06F 15/16* (2006.01)

(52) U.S. Cl. ............................. 709/231; 709/232

(58) Field of Classification Search ............... 709/231, 709/224, 203, 205, 232, 211, 208; 370/466
See application file for complete search history.

(56) References Cited

U.S. PATENT DOCUMENTS

| | | | |
|---|---|---|---|
| 5,611,049 A | | 3/1997 | Pitts |
| 5,657,468 A | | 8/1997 | Stallmo et al. |
| 5,758,085 A | * | 5/1998 | Kouoheris et al. ......... 709/231 |
| 5,832,309 A | * | 11/1998 | Noe et al. .................. 710/61 |
| 5,862,312 A | | 1/1999 | Mann et al. |
| 5,875,456 A | | 2/1999 | Stallmo et al. |
| 6,052,759 A | | 4/2000 | Stallmo et al. |

(Continued)

FOREIGN PATENT DOCUMENTS

WO      WO 02/08899 A2      1/2002

(Continued)

OTHER PUBLICATIONS

"Storage Virtualization", Storage Virtualization Brief, *VERITAS Software Corporation*, pp. 1-19 (Apr. 2001).

(Continued)

*Primary Examiner*—William Vaughn
*Assistant Examiner*—Joseph Maniwang
(74) *Attorney, Agent, or Firm*—Townsend and Townsend and Crew LLP; Gerald T. Gray

(57) ABSTRACT

Systems and methods for delivering streaming data content to a client device over a data communication network in response to a request for the data content from the client device. The client request is received by a server or a controller device that is typically located on a network switch device. If received by a server, the server sends a request to the controller device to control the transfer of the requested data to the client. The controller device includes the processing capability required for retrieving the streaming data and delivering the streaming data directly to the client device without involving the server system. In some cases, the controller device mirrors the data request to another controller device to handle the data processing and delivery functions. In other cases, the controller device coordinates the delivery of the requested data using one or more other similar controller devices in a pipelined fashion.

12 Claims, 18 Drawing Sheets

U.S. PATENT DOCUMENTS

| | | | |
|---|---|---|---|
| 6,085,234 A | 7/2000 | Pitts et al. | |
| 6,112,206 A | 8/2000 | Morris et al. | |
| 6,138,247 A | 10/2000 | McKay et al. | |
| 6,148,414 A | 11/2000 | Brown et al. | 714/9 |
| 6,151,297 A * | 11/2000 | Congdon et al. | 370/216 |
| 6,192,411 B1 * | 2/2001 | Chan et al. | 709/232 |
| 6,216,173 B1 | 4/2001 | Jones et al. | |
| 6,243,829 B1 | 6/2001 | Chan | |
| 6,304,895 B1 * | 10/2001 | Schneider et al. | 709/203 |
| 6,341,315 B1 * | 1/2002 | Arroyo et al. | 709/230 |
| 6,389,432 B1 * | 5/2002 | Pothapragada et al. | 707/205 |
| 6,400,730 B1 * | 6/2002 | Latif et al. | 370/466 |
| 6,401,126 B1 * | 6/2002 | Douceur et al. | 709/231 |
| 6,405,256 B1 * | 6/2002 | Lin et al. | 709/231 |
| 6,463,508 B1 * | 10/2002 | Wolf et al. | 711/133 |
| 6,567,853 B2 * | 5/2003 | Shomler | 709/229 |
| 6,574,795 B1 * | 6/2003 | Carr | 725/71 |
| 2001/0049740 A1 | 12/2001 | Karpoff | |

FOREIGN PATENT DOCUMENTS

WO    WO 02/13033 A1    2/2002

OTHER PUBLICATIONS

"VERITAS SANPoint Foundation Sutie HA Sharing Data in Storage Area Networks," *VERITAS Sofware Corporation*, pp. 1-8 (Jan. 2001).

Sosinsky, B., "The Business Value of Virtual Volume Management", *VERITAS Software Corporation*, pp. 1-12 (Oct. 2001).

Winett, B., Silicon Storage Applicances *Implementation Advantage, DataDirect Networks, Inc.*, pp. 1-13 (Jun. 2001, Rev. Nov. 30, 2001).

Woolery, R., "DataDirect Netorks'Silicon Storage Appliance Enabling Storage Networks," *DataDirect Netorsk,Inc.*, pp. 1-10, no date.

* cited by examiner

FIG. 1A

SCSI PARALLEL INTERFACE (SPI) FEATURES, DEFINED BY SCSI-2

| INTERFACE | BUS SPEED (MBytes/s) | BUS WIDTH (Bits) | MAXIMUM BUS LENGTH (metres) | DEVICES PER BUS |
|---|---|---|---|---|
| FAST SCSI | 10 | 8 | 25 | 8 |
| WIDE SCSI | 10 | 16 | 25 | 16 |
| FAST-WIDE | 10 | 16 | 25 | 16 |

FIG. 1B

SCSI PARALLEL INTERFACE (SPI) FEATURES, DEFINED BY SCSI-3

| INTERFACE | BUS SPEED (MBytes/s) | BUS WIDTH (Bits) | MAXIMUM BUS LENGTH (metres) | DEVICES PER BUS |
|---|---|---|---|---|
| ULTRA SCSI | 20 | 8 | 25 | 8 |
| WIDE ULTRA SCSI | 40 | 16 | 25 | 16 |

FIG. 1C

SCSI PARALLEL INTERFACE-2 (SPI-2) FEATURES, DEFINED BY SCSI-3

| INTERFACE | BUS SPEED (MBytes/s) | BUS WIDTH (Bits) | MAXIMUM BUS LENGTH (metres) | DEVICES PER BUS |
|---|---|---|---|---|
| ULTRA2 SCSI | 40 | 8 | 12 | 8 |
| WIDE ULTRA2 SCSI | 80 | 16 | 12 | 16 |

FIG. 1D

SCSI PARALLEL INTERFACE-3 (SPI-3) FEATURES, DEFINED BY SCSI-3

| INTERFACE | BUS SPEED (MBytes/s) | BUS WIDTH (Bits) | MAXIMUM BUS LENGTH (metres) | DEVICES PER BUS |
|---|---|---|---|---|
| ULTRA3 SCSI | 80 | 8 | 12 | 8 |
| WIDE ULTRA3 SCSI | 160 | 16 | 12 | 16 |

THE FIBRE CHANNEL PROTOCOL STACK

FIG. 3B

| GIGABIT CHANNEL LINKS | FIBRE TRANSCEIVER | DISTANCE | APPLICATION |
|---|---|---|---|
| TWINAX COPPER | ELECTRICAL | 30 m | DATA CENTRE AND WORKGROUP |
| MULTIMODE CABLE 62.5 MICRON | SHORT WAVE LASER | 100 m to 300 m | PRESERVE FDDI CABLE INVESTMENT |
| MULTIMODE CABLE 50 MICRON | SHORT WAVE LASER | 500 m | SMALL CAMPUS |
| MULTIMODE CABLE 7 - 9 MICRON | LONG WAVE LASER | 10 km | LARGE CAMPUS |

INFINIBAND FABRIC ARCHITECTURE

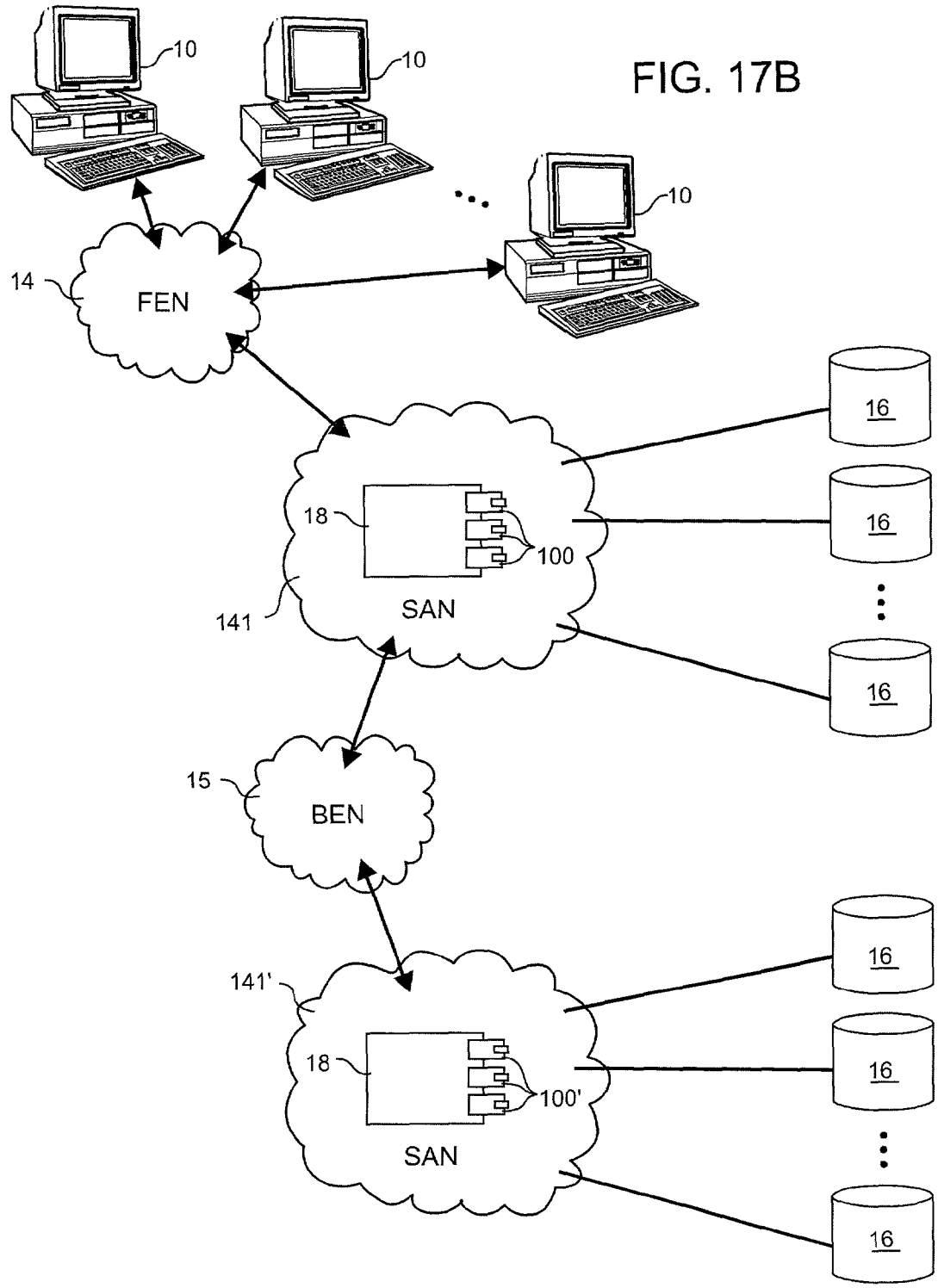

METHOD AND SYSTEM FOR PROVIDING MULTIMEDIA INFORMATION ON DEMAND OVER WIDE AREA NETWORKS

CROSS-REFERENCES TO RELATED APPLICATIONS

This application is related to, and claims priority from, U.S. Provisional Patent Application Ser. No. 60/191,237, filed Mar. 22, 2000, entitled "STORAGE ROUTING AND EXTENDABLE SCREENING SERVER SYSTEMS AND METHODS FOR IMPLEMENTING THE SAME," the disclosure of which is hereby incorporated by reference in its entirety.

BACKGROUND OF THE INVENTION

The present invention relates to Storage Area Networks (SANs). In particular, the present invention relates to methods and systems for providing multimedia data, such as video data, to a client making a request to a data delivery system over a communication network such as a Wide Area Network (WAN).

The Communication Network used to deliver multimedia and video to an end-user (client) typically includes the following three main components: a back-end network comprised of a server system, an end-user system, and a front-end network for connecting a plurality of end-users (clients) to the server system.

The front-end network of a Communication Network is typically comprised of a Wide Area Network (WAN), Local Area Network (LAN), or a Broadcast Area Network (BAN).

Recent developments in both the telephone and cable television services are capitalizing on recent advances in technology in the Art. For example, the increasing level of integration in Very-Large-Scale-Integration (VLSI) technology has facilitated the reduction in cost of motion video compression/decompression hardware and enabled technology such as Asymmetric Digital Subscriber Loop (ADSL).

Similarly, the advances in fiber optic transmission technology and its declining cost have enabled upgrades in front-end network systems such as cable TV network trunk and feeder systems. Traditionally, these systems have increased the bandwidth of the network sufficiently to provide each subscriber his own dedicated channel to the head-end for receiving compressed digital video. Direct broadcast satellite technology and other emerging wireless communication technology also provide dedicated multimedia and video channels between a large number of end-users and the server systems.

Personal computers and set top boxes for the end-user are also emerging which enable networked multimedia applications. Each of these is taking advantage of the low cost video compression/decompression hardware and advances in microprocessor technology.

While the end-user (client) system and the front-end network system infrastructure is evolving rapidly to meet the requirement of interactive multimedia services, current server systems continue to be expensive and impractical for delivering these services because of the limited capacity of the server system. Current server systems are unable to process the large number of streams that are required by streaming multimedia and video services.

The current choices of servers are typically off-the-shelf mainframes or workstation technology based parallel computing systems. The hardware and software in both cases is optimized for computation intensive applications and for supporting multiple concurrent users (time-sharing) with very limited emphasis on moving data to and from the network interface and the Input/Output (I/O) device. A typical example of an input/output device, in accordance with the present invention, is a storage subsystem.

For example, the bandwidth from the memory to cache in an RS/6000 is 400 Mbytes/sec, while the bandwidth from or to the I/O or network device is only 80 Mbytes/sec. The floating-point support adds to the cost of the system without providing any benefit to the delivery of multimedia video and audio data.

The above factors have forced the price and performance of general purpose computing systems to be much higher than server systems optimized for delivery of multimedia data.

Typically, the acknowledged public activity in addressing the above mentioned limitations have been minimal. One methodology has been in the implementation of an optimization in the placement of data on an array of disks. This architecture is used to maximize the disk throughput in the video server application. A second methodology has been in the implementation of the policy of optimization of buffering of data retrieved from disk to maximize its reuse in the video server application. Another methodology would see the implementation of the optimization of the file systems for accompanying multimedia data.

However, the above mentioned improvements may typically only improve the overall performance of current video server systems by a factor of two or four times, whereas the current need in the Industry requires improvements in the range of 100 to 1000 times current technology to make the interactive streaming video services economically feasible.

Notwithstanding the foregoing, another key to multimedia audio and video streaming is the concept of Quality of Service.

"Quality of Service" (QoS) generally refers to a technique for managing computer system resources such as bandwidth by specifying user visible parameters such as message delivery time. Policy rules are used to describe the operation of network elements to make these guarantees. Relevant standards for QoS in the IETF (Internet Engineering Task Force) are the RSVP (Resource Reservation Protocol) and COPS (Common Open Policy Service) protocols. RSVP allows for the reservation of bandwidth in advance, while COPS allows routers and switches to obtain policy rules from a server.

A major requirement in providing Quality of Service is the ability to deliver video frame data at a guaranteed uniform rate. Failure to maintain Quality of Service may typically result in an image that is jerky or distorted.

Traditional server system architectures have not been equipped with the functionality necessary for the implementation of providing Quality of Service on a large scale (more than one dedicated server for each client on the network). With an increasing load on the server systems to provide streaming multimedia applications, an increased volume of user (end-clients), and the above mentioned deficiencies in current server system technology, a need exists to provide a server system architecture which will be able to address this need.

U.S. Pat. No. 5,758,085 (hereinafter, "085' Patent") assigned to the Industrial Business Machine (IBM) Corporation addresses the above-named problems by providing a plurality of intelligent switches in a Storage Area Network (SAN) with the server system. When the end-user (client) makes a request to receive video and multimedia data, a request is sent to the host processor which in turn sends a request to a plurality of intelligent switches on the SAN. The intelligent switches include a cache for storing the requested data. The data is relayed directly from these switches to the end-user (client) requesting the multimedia data.

However, the IBM system described above provides for the storage of data onto switches, it does not allow the individual switches to cooperate together as a distributed architecture in order to pool bandwidth together to supply the backbone network. Current technology allows only for a 1-2 Gigabyte data stream coming out of a single peripheral device such as an array of disks, wherein the network backbone may accommodate a 10 Gigabyte or higher data stream. Also, in the '085 Patent, the individual switches are not able to work together to distribute a delivery request over multiple switches for load balancing and streaming of the requested data.

Accordingly, it is desirable to provide systems and methods that allow for efficient delivery of multi-media and other data content to clients and which overcome problems inherent in existing systems.

SUMMARY OF THE INVENTION

The present invention provides systems and methods for providing video, multimedia and other continuous media content to a client over a network.

The present invention provides systems and methods for delivering streaming data content to a client device over a data communication network in response to a request for the data content from the client device. The client request is received by a server or a controller device that is typically located on a network switch device. If received by a server, the server sends a request to the controller device to control the transfer of the requested data to the client. The controller device includes the processing capability required for retrieving the streaming data and delivering the streaming data directly to the client device without involving the server system. In some cases, the controller device mirrors the data request to another controller device to handle the data processing and delivery functions. In other cases, the controller device coordinates the delivery of the requested data using one or more other similar controller devices in a pipelined fashion.

As used herein, the terms "Storage Area Network," and "Network Attached Storage" are defined as set forth in the publication titled Building Storage Area Networks[1] by Marc Farley, the contents of which are herein incorporated by reference for all purposes.

"Storage Area Network" (SAN) refers typically to a Network which connects one or more servers together. SANs are commonly thought of as fiber channel storage networks transmitting Input/Output (I/O) traffic using serial Small Computer Systems Interface (SCSI) I/O protocol called Fiber Channel Protocol (FCP).

SANs generally uses Fiber channel technology to connect the elements of the SAN together, such as between the server system and the physical disks. Generally, data is transferred on the block level, rather than as actually files. SANs typically are connected directly to the storage device on the network rather than through an I/O bus or channel on the server.

"Network Attached Storage" (NAS) refers typically to a storage system which connects directly from a server. NAS are commonly understood to be turnkey file servers with their own file systems. The Network associated with NAS generally uses Ethernet technology to connect the elements of the NAS together, such as between the server system and the NAS storage element. Generally, data is transferred on the file level, rather than the disk block level. NAS typically is connected to the storage device through an I/O bus or channel on the server, rather than direct attached storage.

As used herein, the terms "Wide Area Network," "Local Area Network," and "Broadcast Area Network" are defined as set forth in the Dictionary of Storage and Storage Networking Terminology[2] produced by SNIA (Storage Networking Industry Association), the contents of which are herein incorporated by reference for all purposes.

"Wide Area Network" (WAN) generally refers to a communication network that is geographically dispersed and that includes telecommunication links. A commonly used WAN is the public telephone network. The telephone network today provides access to electronically stored data in various media. These media include multimedia, video, audio and textual information.

"Local Area Network" (LAN) refers generally to a communication infrastructure designed to use dedicated wiring over a limited distance (typically a diameter of less than five kilometers) to connect a large number of intercommunicating nodes. A Commonly used LAN is the Ethernet.

"Broadcast Area Network" (BAN) refers generally to a communication infrastructure designed for the transmission of data over the broadcast/cable television system. A commonly used BAN is the cable connection provided in the home for watching multimedia and video programming.

"Metropolitan Area Network" (MAN) generally refers to a network that interconnects users with computer resources in a geographic area or region larger than that covered by even a large local area network (LAN) but smaller than the area covered by a wide area network (WAN). The term is applied to the interconnection of networks in a city into a single larger network (which may then also offer efficient connection to a wide area network). It is also used to mean the interconnection of several local area networks by bridging them with a backbone.

Collectively, the term "Front End Network" (FEN) will be used to describe the various communication infrastructures, as set forth above: WAN, LAN, BAN, MAN, and SAN. The term "FEN" may also be comprised of any combination, or sub combination of these various communication infrastructures.

It should be apparent to one skilled in the art, that the scope of the invention is intended on included any other communication network used in the communication of digital data over a network interconnect, according to the embodiments of the present invention.

The present invention provides a number of advantages over traditional Host Bus Adapter (HBA) implementations. Such advantages include:

Latency between individual blades is significantly reduced;

The bandwidth between individual blades is improved;

Access to the fabric, depending upon the nature of the switching fabric implementation, provide multicast communication to other blades, even though the external network may not support multicast or may not support multicast in an efficient manner;

The above provides advantages to most any storage control logic that involves multiple servers or disk connections. Moving the individual functional components of the controller device onto the switching fabric has some specific benefits, including:

Moving the cache management logic onto the controller device means the synchronization communication between individual controller devices would enjoy reduced latency.;

Moving the cache onto the controller device improves the efficiency of cache pooling—the concept of getting data from remote controller devices without the requirement of going to disk because of reduced latency and, potentially, increased bandwidth. In applications such as video streaming, there is the opportunity for an improved Quality of Service (Q of S);

Moving the RAID engine onto the controller device increases the overall throughput by allowing the additional RAID I/O streams (e.g. two streams involved with mirroring across redundancy groups) to be sent in parallel with other communications. In an HBA implementation, all streams must share a single channel on the external network (e.g. Fiberchannel). There is a balance here. Placing the cache on the blades (within the switching fabric) may increase the latency of copying from cache into the server. However, as the block speed of the physical network increases, this generally becomes less of an issue; and Moving the administrative functionality onto the controller device generally reduces the time required for administrative functions such as replication and backups.

According to an aspect of the present invention, a method is provided for delivering streaming data content to a client device over a data communication network in response to a request for the data content from the client device. The method typically includes receiving, by a server, a request from a first client device over the data communication network, the request identifying streaming data content stored on a storage system, identifying a first controller device associated with the storage system on which the data content is stored, and transmitting a data request message from the server to the first controller device, the data request message identifying the first client device and the data content requested by the first client device. The method also typically includes retrieving, by the first controller device, the streaming data content from the storage system, and transferring the retrieved data content directly to the first client device over the data communication network from the first controller device through a communication port for communicably coupling the first controller device to the data communication network.

According to another aspect of the present invention, a method is provided for delivering streaming data content to a client device over a data communication network in response to a request for the data content from the client device. The method typically includes receiving, by a first controller device, a request from a first client device over the data communication network, the request identifying streaming data content stored on a storage system, identifying a second controller device associated with the storage system on which the data content is stored, and transmitting a data request message from the first controller device to the second controller device, the data request message identifying the first client device and the data content requested by the first client device. The method also typically includes retrieving, by the second controller device, the streaming data content from the storage system, and transferring the retrieved data content directly to the first client device over the data communication network from the second controller device through a communication port for communicably coupling the second controller device to the data communication network.

According to yet another aspect of the present invention, a method is provided for delivering streaming data content to a client device over a data communication network in response to a request for the data content from the client device. The method typically includes receiving, by a server, a request from a first client device over a first data communication network, the request identifying streaming data content stored on a storage system, transmitting a data request message from the server to a first controller device, the data request message identifying the first client device and the data content requested by the first client device, identifying a second controller device associated with the storage system on which the data content is stored, and transmitting a second data request message to the second controller device, the second data request message identifying the first client device and the data content requested by the first client device. The method also typically includes retrieving, by the second controller device, the streaming data content from the storage system, and transferring the retrieved data content directly to the first client device from the second controller device.

According to a further aspect of the present invention, a method is provided for delivering streaming data content to a client device from two or more controller devices over a data communication network in response to a request for the data content from the client device, wherein the data content includes two or more blocks of data stored on a storage system. The method typically includes receiving, by a server, a request from a first client device over the data communication network, the request identifying streaming data content stored on a storage system, transmitting a data request message from the server to a first controller device associated with the storage system, the data request message identifying the first client device and the data content requested by the first client device, and retrieving a first block of the data content from the storage system by the first controller device. the method also typically includes sending a second data request message from the first controller device to a second controller device associated with the storage system, the second data request message identifying the first client device and a second block of the data content, retrieving the second block of the data content from the storage system by the second controller device, transferring the first block of data directly to the first client device from the first controller device, sending a synchronization message from the first controller device to the second controller device, and in response to the synchronization message, transferring the second block of data directly to the first client device from the second controller device.

According to yet a further aspect of the present invention, a method is provided for delivering streaming data content to a client device over a data communication network in response to a request for the data content from the client device. The method typically includes receiving, by a server, a request from a first client device over the data communication network, the request identifying streaming data content stored on a storage system, and transmitting a data request message over the data communication network from the server to a first controller device, wherein the data request message identifies the first client device and the data content requested by the first client device, and wherein the first controller is coupled to the storage system over a storage area network (SAN). The method also typically includes retrieving, by the first controller device, the streaming data content from the storage system over the SAN, and transferring the retrieved data content directly to the first client device over the data communication network from the first controller device.

According to still a further aspect of the present invention, a method is provided for delivering streaming data content to a client device over a data communication network in response to a request for the data content from the client device. The method typically includes receiving, by a first controller device, a request sent by a first client device to a server over the data communication network, the request identifying streaming data content stored on a storage system, wherein the first controller device and the server are coupled by the data communication network, processing the request by the first controller device, and controlling, by the first controller device, the delivery of the requested streaming data directly to the first client device over the data communication network by one of the first controller device and a second controller device. Typically, the processing by the first controller device and the delivery of the data content is performed without involvement by the server to which the request was originally intended.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

The foregoing summary of the invention, as well as the following detailed description of preferred embodiments, is better understood when read in conjunction with the accompanying drawings, which are included by way of example, and not intended on being limiting by way of the claimed invention.

FIGS. 1A-D illustrates a comparison of the various SCSI architectures for both Ultra SCSI and Wide Ultra SCSI for SCSI-1, SCSI-2 and SCSI-3;

FIG. 3B. is a comparison of the various Fiber Channel Protocols, according to an embodiment of a messaging protocol of the present invention;

FIG. 17B illustrates an embodiment of the invention, according to step 304 of FIG. 16. in which the request message is sent directly to a controller device 100 on SAN 141 which communicates with a controller device 100' which is located on SAN 141' over a BEN 15.

DESCRIPTION OF THE SPECIFIC EMBODIMENTS

Figure 2:
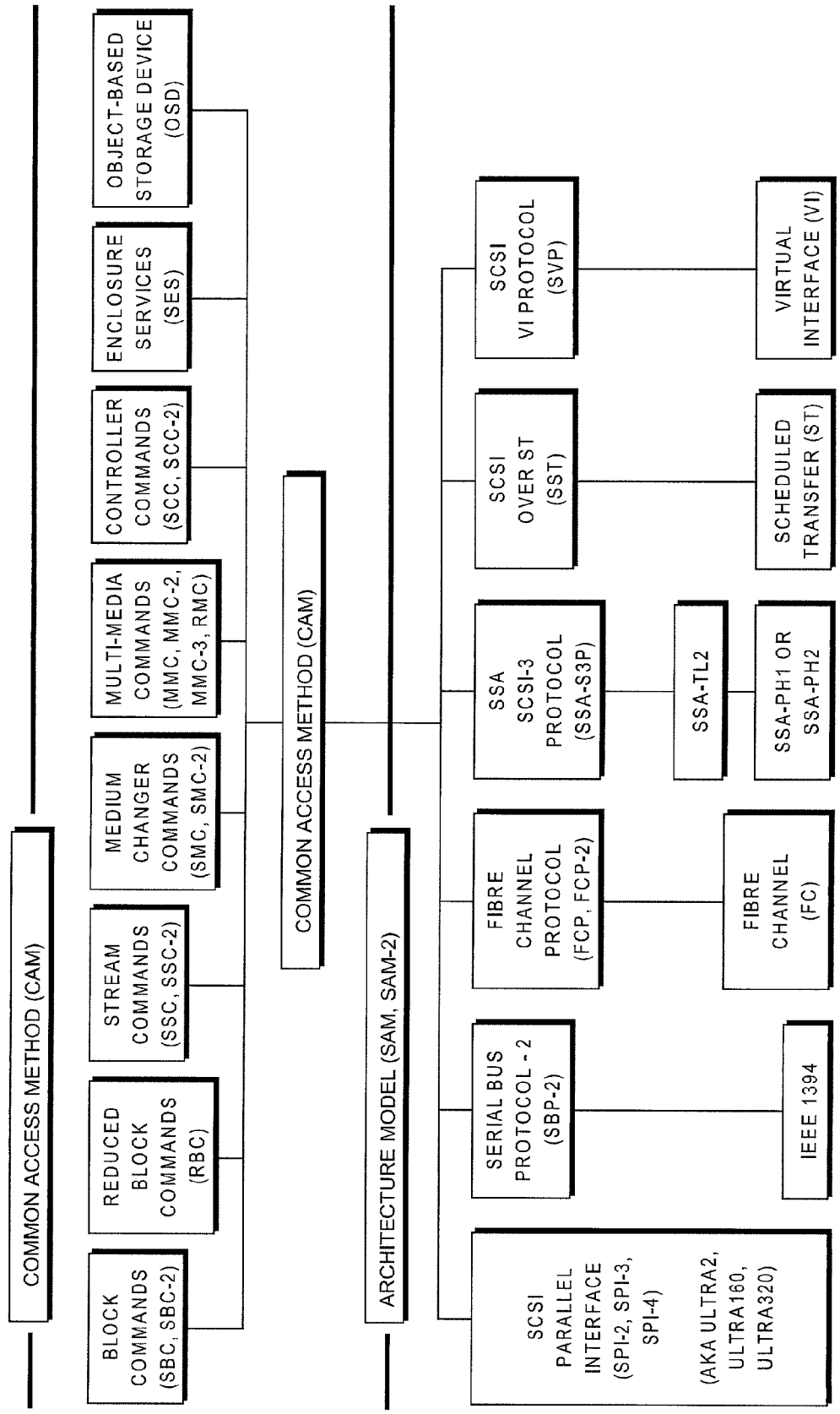
FIG. 2 illustrates the scope of the SCSI-3 architecture, according to an embodiment of a messaging protocol of the present invention.

In the following description, although the use of a packet-switched network which transports only fixed size cells is described, the following can easily be adapted for use in networks which transport variable size packets or in circuit switched network.

The present invention includes two components, the first component includes the messaging scheme (hereinafter, "Messaging Protocols") for communicating the video data or other data content from the controller card to the client with the intermittent interaction by the host or server through the switch, and the second component is the hardware and software functionality provided in the controller devices, switches and servers for effecting th messaging schemes (hereinafter, "Network Architecture").

(1) Messaging Protocols

The messaging schemes of the present invention use a number of different messaging protocols used in the transmission of data across the network. The term "messaging protocol" is defined to include the protocol, or combination of protocols, used in the communication of a request packet sent from the client to the server, or the client to the controller device, and the control message or portion thereof between the server and the controller device, and the data packets from the controller device to the client (hereinafter, "nodes").

Typical examples of messaging protocols used in accordance with the present invention for sending messages between the various nodes on the network include: Small Computer System Interface (SCSI), Fiberchannel (FC),), Infiniband (IB), Gigabit Ethernet (GE), Ten Gigabit Ethernet (10GE), and Sonet. Although, it should be apparent to one skilled in the art that the invention is not restricted to only the protocols listed above, any messaging protocol, or combination of messaging protocols which allows for the communication of messages between the various nodes of the network are intended to be within the scope of the invention.

Small Systems Computer Interface (SCSI) Protocols:

Originally, an American National Standard Institute (ANSI) standard, SCSI protocols were introduced as an open standard for networked storage services that enabled an n-tier approach to the scale of storage capacity.

Referring to FIGS. 1A-1D, a comparison of the various SCSI architectures is listed for both Ultra SCSI and Wide Ultra SCSI for SCSI-1, SCSI-2 and SCSI-3.

In particular, a 320 Mbytes per second SCSI bus standard has been submitted to ANSI under SCSI Parallel Interface-4 (SPI-4) Features, defined by SPI-4. It is anticipated that products supporting this specification will be shipping by mid-2001.[1]

To overcome the distance sacrifice that faster versions of the SCSI parallel bus interface were subject to, SCSI-3 set out to add new functionality in the form of longer distance separation between devices, serialized transport mechanisms, and network-capable software protocols. In order to accommodate all of these features and maintain backward compatibility, SCSI-3 expanded to become a "family" of standards, categorized as either a logical or a physical interface.

Referring to FIG. 2, the scope of the SCSI-3 architecture is illustrated. As shown in FIG. 2, three physical interfaces are defined by the SCSI Architecture Model (SAM) of SCSI-3 that enable serialized transport of SCSI channel protocol traffic: 1394 (also known as Fire Wire), Serial Storage Architecture (SSA), and Fiber Channel. Fiber Channel has emerged as an open standard that virtually all providers of storage solutions are implementing to enable a serial transport for SCSI.

Fiber Channel Protocols:

Fiber Channel is unique among broadly adopted open standard transports in that it accommodates data traffic that includes both channel and networking protocols.

Figure 3A:
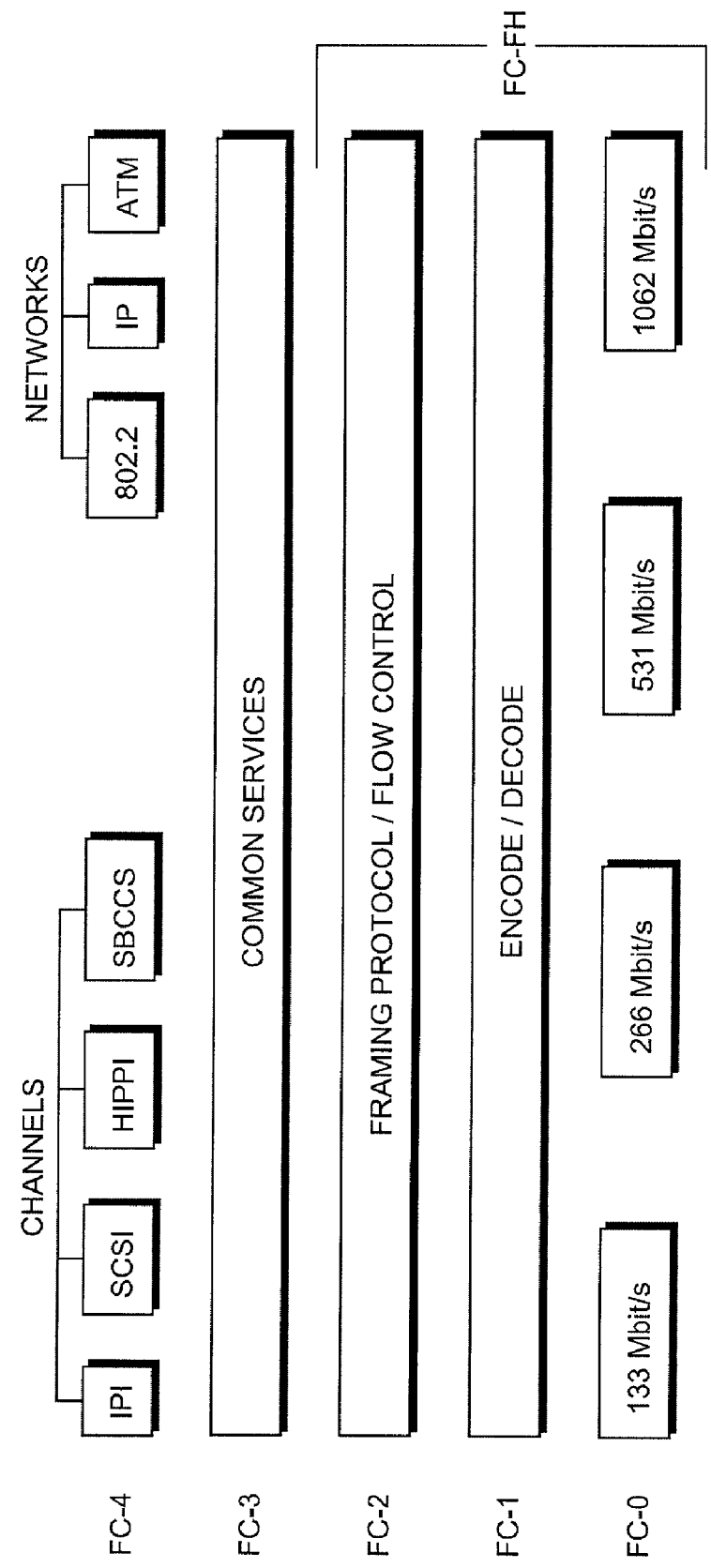
FIG. 3A is a block diagram of a typical Fiber Channel Protocol Stack, according to an embodiment of a messaging protocol of the present invention.

Referring to FIG. 3A, a typical Fiber Channel Protocol Stack is shown. Fiber Channel provides a high-speed physical layer and a low latency data link mechanism that is well suited for the demands of storage I/O applications. Furthermore, it is specifically designated to transparently support upper-layer transport protocols such as the SCSI command protocol. It also offers improved performance versus the SCSI physical and data link standards.

Referring to FIG. 3B, a comparison is given of the various Fiber Channel Protocols. Fiber Channel enables link distances of up to 10 kilometers between any two servers, storage, or network infrastructure devices. This compares to a maximum radius of 25 meters for all devices when using SCSI bus technology. Fiber Channel supports a range of link media and transceiver types depending on the distance requirement of individual links. Link media types range from twin-axial copper to multi-mode fiber optic and single-mode fiber optic cable. Transceiver types range from electrical for copper media to short wavelength lasers and long wavelength lasers for fiber optic cable.

Infiniband Protocols:

The goal of Infiniband is to replace PCI's contentious shared-bus topology with a switched fabric architecture. This seemingly simple design offers increased system performance, enhanced reliability, greater availability and independent scalability of fabric elements. In fact, by replacing the shared-bus architecture with Infiniband Technology, servers have the flexibility to remove I/O from the server chassis, creating greater server density. Furthermore, the removal of the I/O from the server chassis allows for a more flexible and scalable data center as independent fabric nodes may be added based on individual need. Performance is increased by the switched fabric nature of the infrastructure so that applications don't contend for bandwidth as in a shared-bus environment.

Figure 4A:
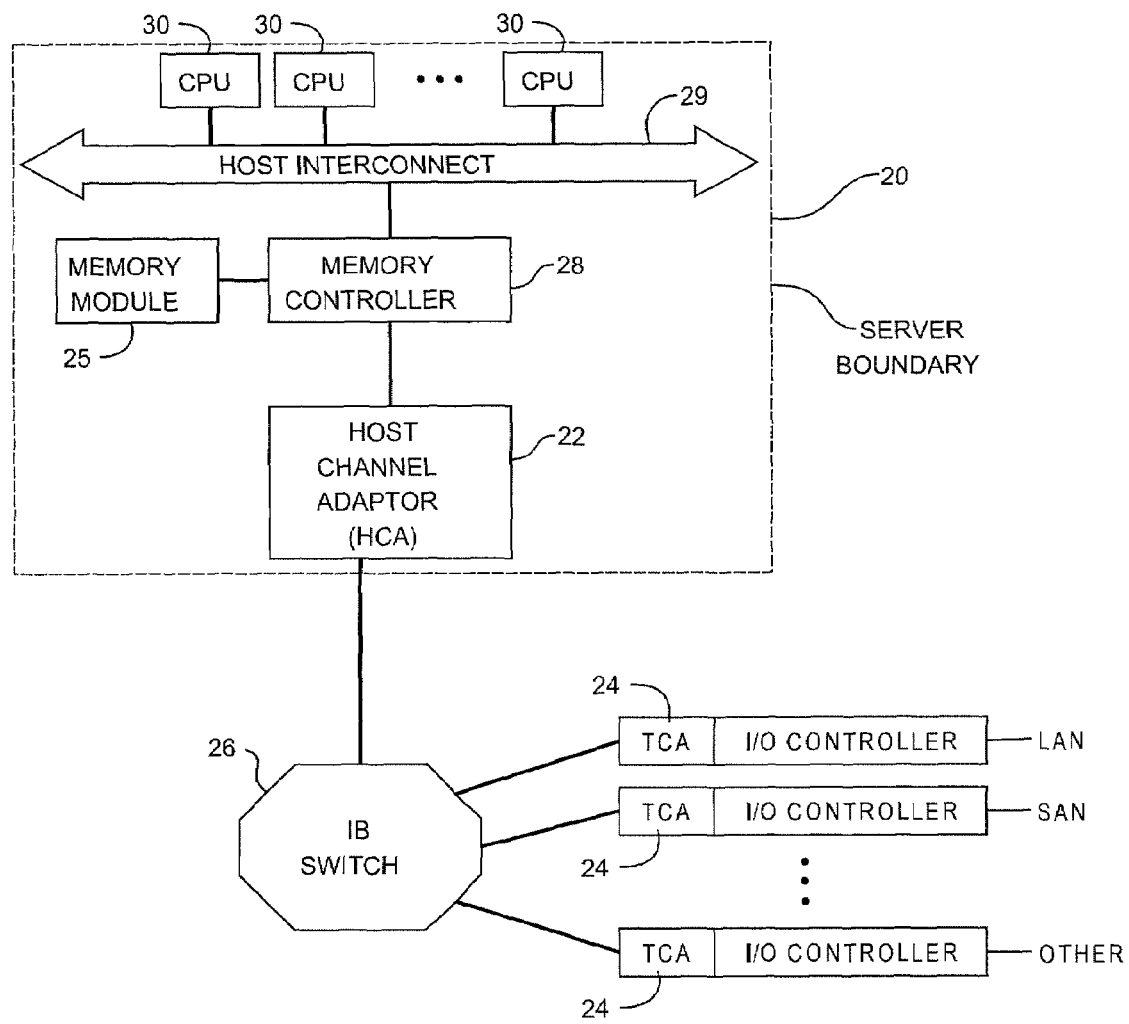
FIG. 4A illustrates a typical Infiniband Architecture, according to an embodiment of a messaging protocol of the present invention.

Referring to FIG. 4A, a typical InfiniBand Server Architecture is shown. The InfiniBand architecture defines an architecture that enables remote DMA (RDMA) or channel oriented communication, making it an ideal solution for server clustering. The adapters that attach nodes to an InfiniBand fabric execute this mapping via a hardware-oriented link protocol that offloads transport functionality from the host, resulting in minimal CPU utilization. Infiniband link protocol defines two layers of communication for each data transaction. The core fabric element of data transfer is the packet, a routable unit of transfer that can support a wide range of Maximum Transmission Units (MTUs). These packets are typically multiplexed into a logical format for transport using messages, each mapped to one of 16 virtual lanes on a link that provides for flow control over a serial transport. The fabric may support links including a varying number of virtual lanes, although mapping algorithms are defined in the specification that allow for interoperability between unlike links.

In executing transactions, a working list of messages is compiled in memory tables and scheduled for delivery, and information is transferred between any two nodes in the form of full-duplexed exchanges known as queue pairs. As an added management, Infiniband specifies a means by which to define reliable Quality of Service metrics for each queued transaction based upon the application for which the data transfer is associated.

Figure 4B:
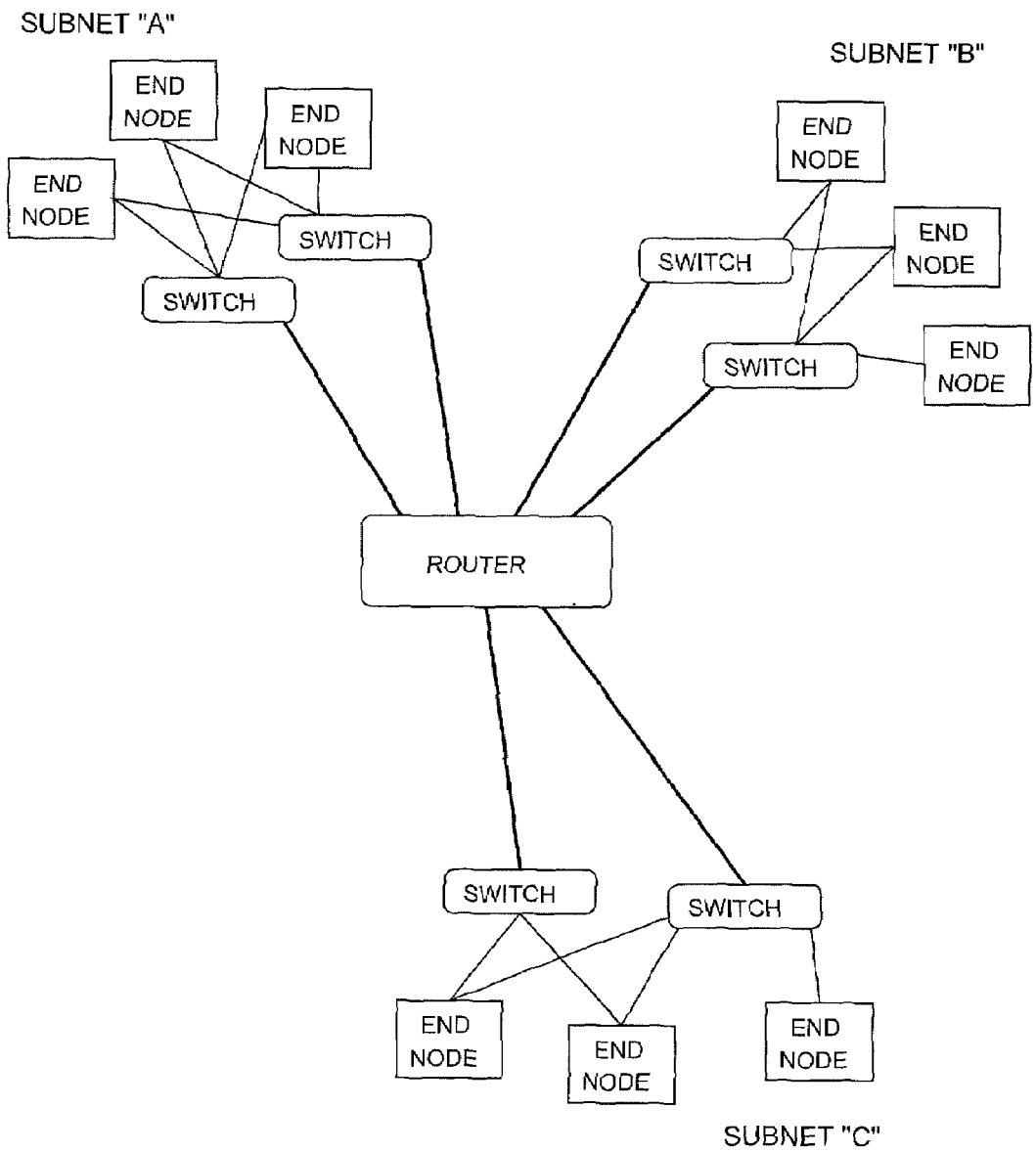
FIG. 4B illustrates a typical Infiniband Fabric Architecture on the network including the subnetworks architecture.

Referring to FIG. 4B, a typical Infiniband Fabric Architecture is shown. Infiniband design parameters provide for the creation of highly scalable "sub networks", groups of nodes that lie within a 300-meter diameter. These subnetworks ("subnets") are based upon a fabric-centric configuration, and Infiniband provides a transport by which interprocessor storage I/O, or network I/O traffic can be interconnected through a single I/O controller. Like Fiber Channel, Infiniband establishes channels between any two points in the subnet, utilizing a high-throughput, highly redundant, mesh-fabric switching architecture. Nodes attached to the fabric can be assembled into logical subsets or partitions in order to group hosts or devices with like attributes, much like zoning capabilities of Fiber Channel fabrics. For example, a Storage Service Provide (SSP) may choose to zone a particular subnet of clients requiring streaming video into one zone, and another subnet of clients into another zone.

One of the nodes in a subnet, typically a fabric switch, serves the function of subnet manager that configures all attached devices and constantly pings connected nodes to ensure their readiness to send or receive datagrams. Between subnets, inter-networking of Infiniband traffic can be routed using the addressing scheme provided by IP version 6 (Ipv6). Although message delivery transpires at the transport layer, routing is done at the network layer through the use of global routing with packets, which allows for identifying and controlling IPC and I/O processes. Should a TCP/IP-oriented data stream from the Internet reach the router of an InfiniBand data center, delivery of the datagram to the appropriate node with the Infiniband fabric could be expedited by the presence of a TCP/IP offload engine in the firewall or the router.

Referring back to FIG. 4A, a typical InfiniBand Architecture 20 includes one or more Central Processing Units (CPUs) 30, a Memory Controller 28, a Host Interconnect 29, a Host Channel Adapter (HCA) 22, a Target Channel Adapter (TCA) 24, and one or more Switches 26.

The HCA 22 is typically an adapter installed within the host, server or controller device of the fabric. The HCA 22 typically connects the memory controller 28 in the host, server or controller device to the network. HCA (22) supports all of the functions that are necessary to provide varying degrees of service for data delivery. Additionally, the HCA 22 provides security features that protect the memory regions on both ends of a link. Further, the HCA 22 provides a link protocol engine that implements the protocol of an Infiniband link in hardware. The link protocol engine is typically being developed as functional blocks to be integrated into system chips such as CPUs 30, and as stand alone devices to assist in the migration from legacy systems and target side applications.

Typically, the HCA 22 is connected to a plurality of CPUs 30 across the Host Interconnect 29. At least one memory controller 28 provides a connection to a memory module 25.

The TCA 24 is an adapter that attaches to the end nodes of the fabric. TCAs 24 typically only implement what is required to minimally support both the fabric and any capability that is specific to the device in which it is embedded. For example, if the TCA 24 is embedded into a storage array, Fiber Channel processes that support internal disk drives are typically buried in the TCA 24 and bridged to Infiniband. Like the HCA 22, a link protocol engine is required on the target end, as is a work queue engine having both memory and channel functionality.

The functionality of the switches 26 in an Infiniband fabric revolves around routing only packets to the nodes within a subnet. As a result, the cost of these devices is not as inhibiting due to the reduced complexity. Typically, these switches 26 include a forwarding table that establishes where incoming packets are to be routed based upon the level of service for the traffic. They also serve to maintain partitions within the fabric to segment data paths.

Figure 5:
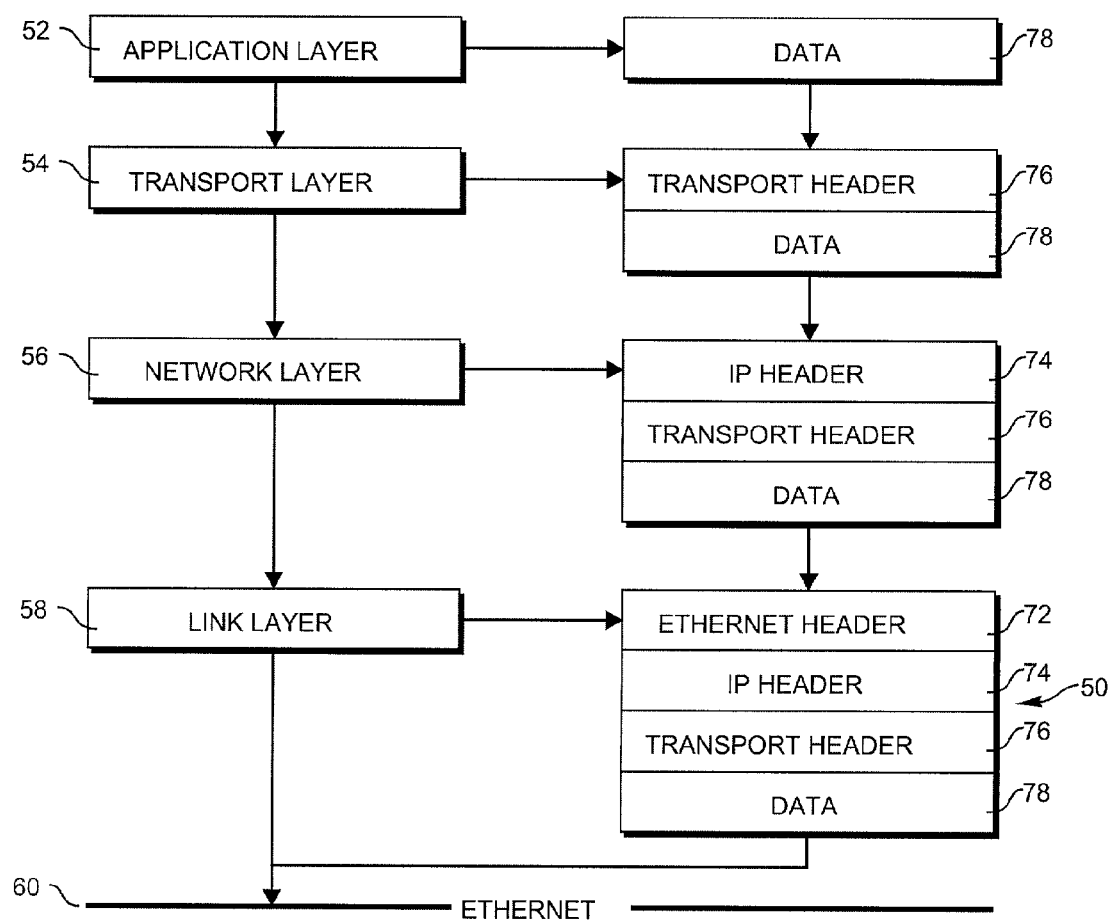
FIG. 5 illustrates a typical Ethernet Protocol Stack, according to an embodiment of a messaging protocol of the present invention.

Ethernet Protocols:

Referring to FIG. 5, a typical Ethernet Protocol Stack 50 is shown. Ethernet defines a Layer 2 addressing scheme, working at both the physical and data link layers of the Open Systems Interconnection (OSI) standard. The Ethernet Protocol Stack 50) typically includes an Application Layer 52, a Transport Layer 54, a Network Layer 56, a Link Layer 58 and a Physical Layer 60. The Application Layer 52 includes the Hypertext Transfer Protocol (HTTP) according to one embodiment of the invention.

Furthermore, Ethernet works in conjunction with TCP/IP which resides at Layers 3 and higher to execute both a local and wide-area networking implementation. Just as TCP/IP breaks information down into packets for transmission, data has to be segmented in the LAN to ensure equivalent bandwidth availability to all host on the network.

Figure 7:
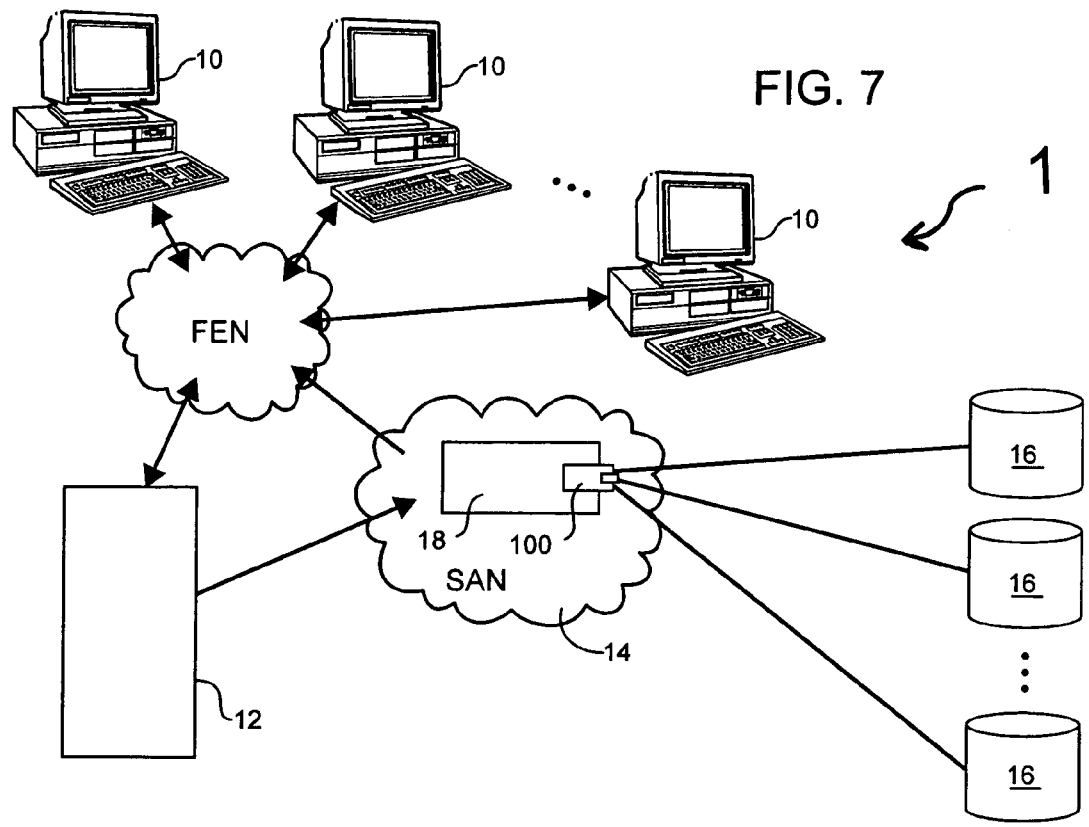
FIG. 7 shows an exemplary configuration of a data communication network, which includes an individual switch with at least one controller device according to one embodiment of the present invention.

Towards this end, each computer attached to the Ethernet LAN, which includes both the clients 10) and server 12 (e.g., with reference to FIG. 7, transmits information in a way that accommodates a predefined packet size called a Maximum Transmission Unit (MTU), the value of which is 1,518 bytes for Ethernet. These packets are addressed at the LAN level using an Ethernet header that contains a unique MAC address. Every computer that attaches to an Ethernet network has a unique 48-bit MAC address, distinct from the 32-bit IP address, to determine which node on the LAN is the correct destination for the packet.

Figure 6:
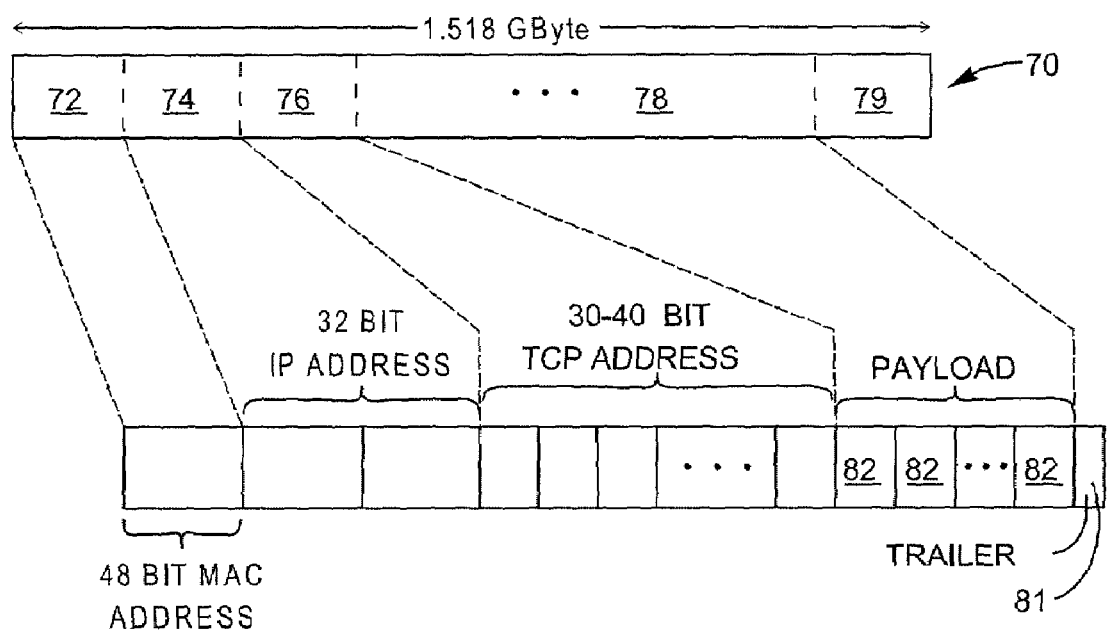
FIG. 6 shows the Ethernet Packet, according to an embodiment of a messaging protocol illustrating a typical data format for an audio and video payload.

Referring to FIG. 6, a typical ethernet packet 70 is shown. The packet 70 typically includes the following components: an ethernet header component 72, an IP header component 74, a transport header component 76, and a payload or data component 78. The payload component 78 also typically includes a trailer portion 79. Each of the header components 72-78 of the Ethernet packet 70 corresponds to a layer of the Ethernet Protocol Stack 50. For example, the Link Layer 58 includes the Ethernet header component 72 which is typically a 48-bit MAC address. The Network Layer (56) includes the IP header component 74 which is typically a 32-bit IP address. The IP address provides the source and destination of the particular messaging packet as is concerned with routing the packet between the various nodes on the network. The Transport layer 54 includes the Transport header component 76 or Transmission Control Protocol (TCP) which is involved in the construction of the data packets. The typical size of the Transport header component 76 is 30-40 bits. The Application Layer 52 includes the payload or data 78 which is sent down the wire between the various nodes on the network. The size of the packet varies depending upon the type and content of the data. Finally, the Physical Layer 60 includes the physical hardware used to send the Ethernet packets between the various nodes of the network. This includes the various devices and the actual physical wires used to transmit the message.

The payload component 78 of the ethernet packet 70 can include audio, video, text, or any other type of binary data. However, according to streaming audio and video data in accordance to at least one embodiment of the invention the payload component 78 includes audio and video data formats. Any type of audio or video format that is supported by the ethernet protocol is within the scope of the invention.

Referring back to FIG. 6, a typical data format for an audio and video payload is shown. In one embodiment, MPEG-II is used for transporting data payload 78, carrying one video and one audio channel as a video content. Each second of video data is compressed into 4 Megabits of digital data. The payload 78 is comprised of sequential 4 Megabit packets 82. Each packet 82 is preferably streamed over the network 14 (e.g., FIG. 7) from a controller device 100 to a client 10 initiating the request for audio and video data, the details of which will be described hereinafter.

Referring to FIG. 7, a data communication network 1 is shown, in accordance with the present invention. The network 1 includes a storage controller device (hereinafter, "controller device") 100, which typically provides control over storage functions and network access. In one embodiment, the network 1 includes one or more clients 10, at least one server (12), a network 14 connecting the clients 10 to the server 12. A typical network 14 includes one of a Local Area Network (LAN), a Wide Area Network (WAN), a Metropolitan Area Network (MAN), and a Storage Area Network (SAN) (hereinafter, collectively called "FEN") or any other network that provides for communication between the client and the server.

Network 1 also includes one or more substorage devices 16, which are typically, an array of disk or tape drives. The substorage devices 16 are connected to the controller device 100 over a network, which is typically a Storage Area Network (SAN). The controller device 100 is preferably included in a switch 18 used in communicating between the various nodes on the network 1. It should be appreciated that the controller device 100 may be implemented in a router, bridge or other network device.

Figure 8:
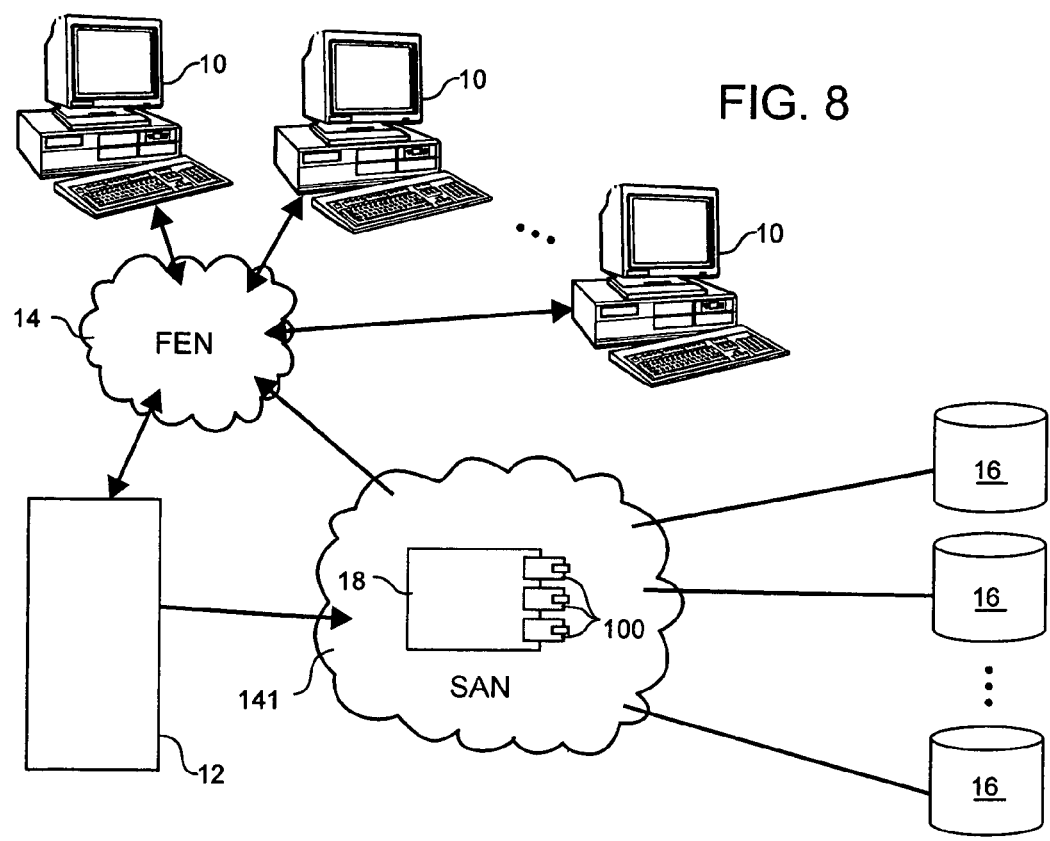
FIG. 8 shows an exemplary configuration of FIG. 7, wherein an individual switch includes a plurality of controller devices.

Referring to FIG. 8, which shows an alternate embodiment, a plurality of controller devices 100 are included in a switch device 18, with each controller device 100 connected to the others over an interconnect medium such as a Host Bus Adapter (HBA) interface, which is typically a Peripheral Computer Interface (PCI).

Figure 9:
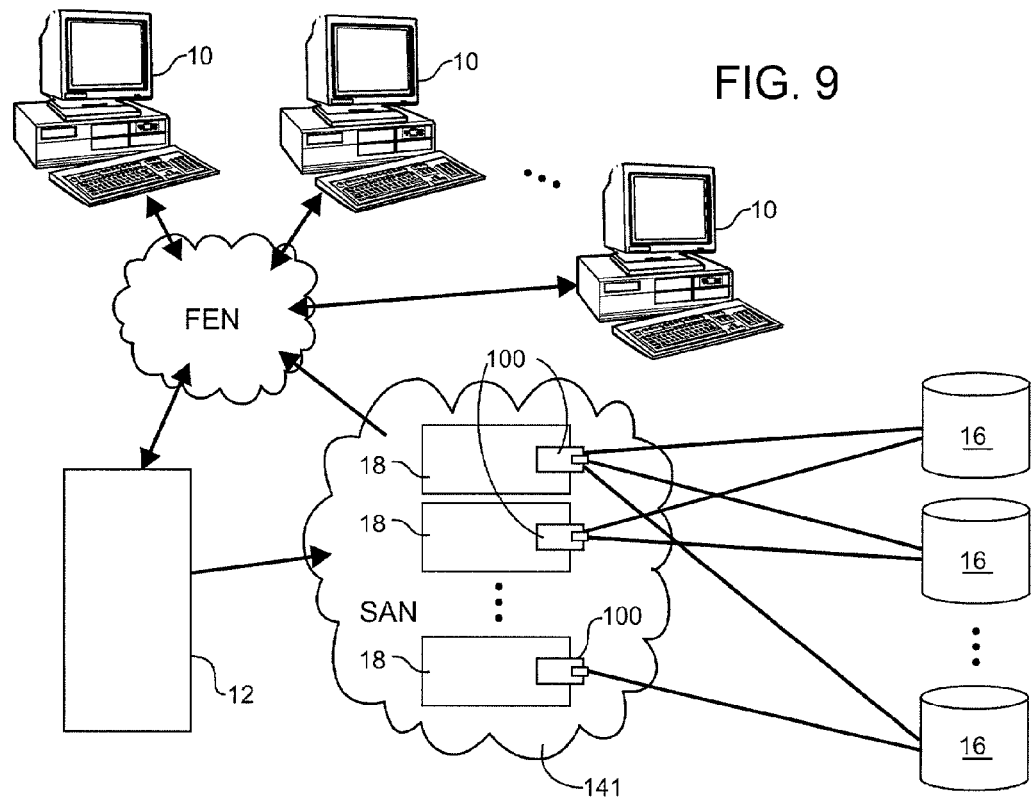
FIG. 9 shows an exemplary configuration of a data communication network, which includes a plurality of individual switches, each of which includes an individual controller device.

Referring to FIG. 9, which shows another alternate embodiment, a plurality of switches 18 are provided, each switch 18 having at least one controller card 100 communicating with the controller devices 100 on the other switches 18.

Figure 10:
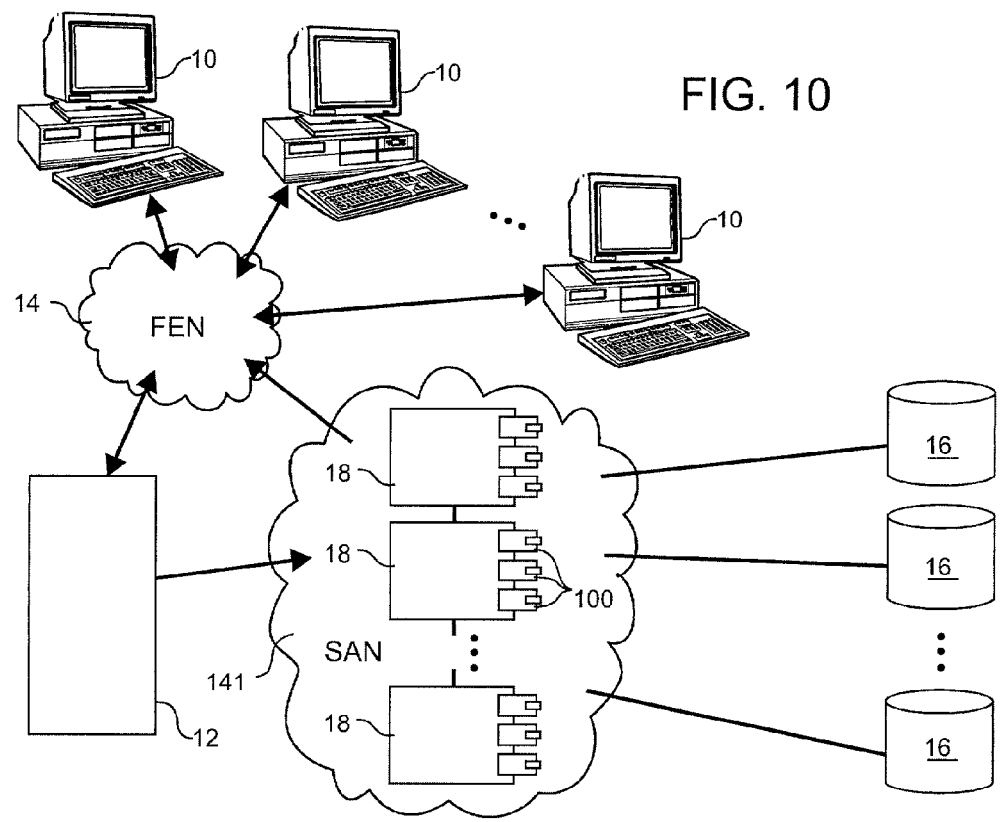
FIG. 10 shows an exemplary configuration of FIG. 9, wherein each individual switch includes a plurality of controller devices.

Referring to FIG. 10, which shows another alternate embodiment, each one of the switches 18 includes a plurality of controller devices 100. Each of the controller devices 100 on a switch 18 is able to communicate over the switch fabric 109 with each and every other controller card 100 on the other switches 18. Alternatively, each of the controller devices 100 are able to communicate with each and every other controller device 100 over network 141.

In one embodiment, the storage management and administration functionality of the server 12 is integrated on the controller device 100, such that a client 10 may communicate directly with the controller device 100 through the FEN 14 without involving the server 12.

Figure 12A:
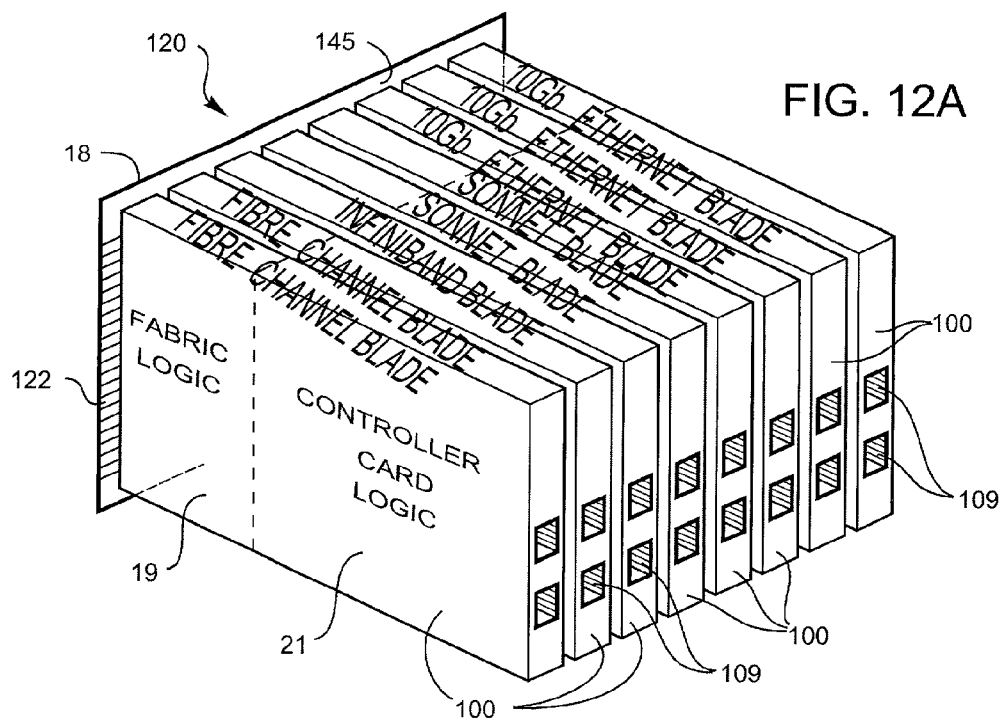
FIG. 12A shows an exemplary view of the controller device according to the present invention.
Figure 12B:
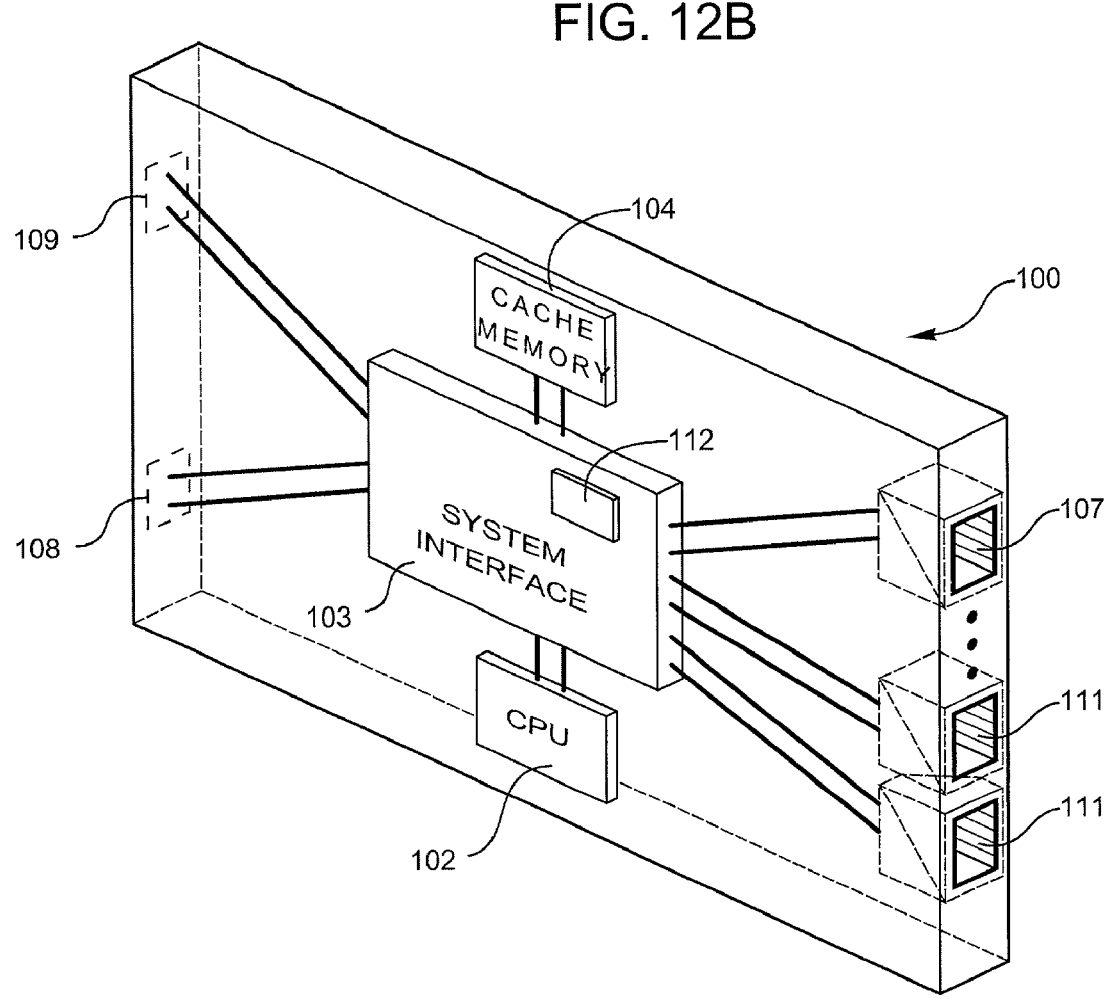
FIG. 12B shows an exemplary configuration of the controller device according to a switched based fabric configuration according to the present invention.

In this embodiment, referring to FIG. 12B, the controller device 100 includes a Central Processing Unit (CPU) 102, a cache memory module 104) used as a data cache and for supporting processing and a system interconnect interface 103 for connecting the CPU 102, cache memory 104 and communication ports 109. The controller device 100 typically includes at least one communication port 109 used to communicate with the external network, other controller devices or other peripherals. For example, the communication port 109 may be comprised of a SAN port 111 for communication with physical disks 110, a WAN port 107 used to connect with the wide area network (WAN), a server port 108 used to connect with servers, and at least one additional communication port 109 used for communication between a plurality of controller devices 100. The system interface 103 may typically be comprised of a Field Programmable Gate Array (FPGA) or Application Specific Integrated Circuit (ASIC). An optional computation engine 112 may be included on the system interface 103 which is used to accelerate operations such as RAID check sum calculations, encryption, and compression, and assorted data routing and support chips.

As mentioned previously, more than one of the above communication ports 106-109 may be combined into a single communication port supporting many different protocols. For example, the communication port 107 used to connect the controller device to the server, and the communication port 108 used to connect the controller device 100 to a disk drive peripheral 110, and the communication port 109 used to connect the controller device 100 to another controller device 100 may all be a Fiber Channel (FC) communication ports. It should be appreciated to one skilled in the art that the term "communication port" is intended to be construed broadly to include any combination and sub combination of different communication ports for allowing the communication of messaging protocols over the network.

Also, it should be appreciated that many modifications and configuration changes are intended to be within the scope of the invention for designing the controller devices 100 in accordance with the present invention. As disclosed in FIG. 12B, the hardware configuration of the controller device 100 is implemented in a controller card (e.g., "blade"). The actual hardware configuration may be modified depending upon the optimization of the application(s) required by the client upon the network configuration. U.S. Pat. No. 6,148,414, which is hereby incorporated by reference in its entirety for all purposes, provides useful controller card and device configurations for embodiments of the present invention.

Figure 11:
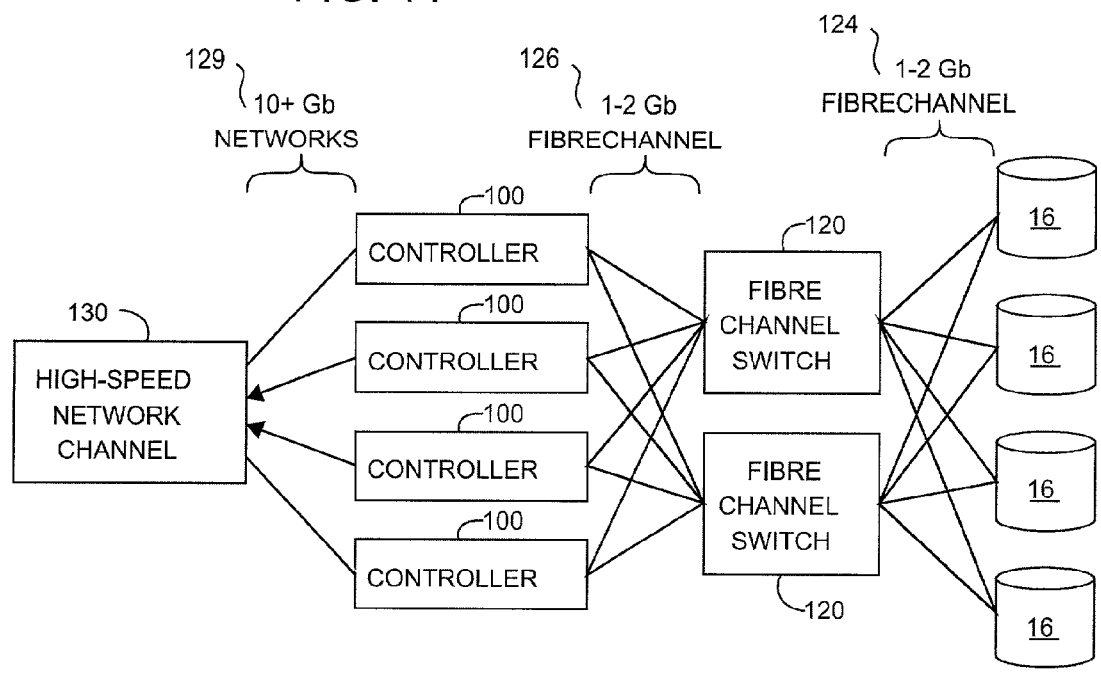
FIG. 11 shows an array of controller devices communicating with a pair of fiber channel switches for feeding a high-speed network channel.

In one embodiment, shown in FIG. 11, two Fiber Channel gateway switches 120 are used to communicate with a plurality disks 16 via dual redundant Fiber Channel switches 18. In one embodiment, the interconnect medium 124 between the disks 16 and each switch 120 and the interconnect medium 126 between each switch 120 and the controller device 100 is typically 1-2 Gigabit Fiber Channel interconnect. The interconnect medium 129 between the controller devices 100 and the high-speed network 130 is typically a 10 Gibabit or higher network interconnect.

Each controller device 100 communicates with every other communication device 100 over the interconnect medium 126. The distributed nature of the controller device architecture allows the aggregate of the array of controller devices 100, each of which has a 1-2 Gigabit FC stream into each controller device on the SAN side, to provide a 10 Gigabit or higher stream coming out of the array of controller devices 100 on the FEN side.

Many form factors for the implementation of the controller devices 100 on the network are possible. For example, in one embodiment, one form factor (with reference to FIG. 12), the "Switch Blade" 120 implementation, includes multiple controllers 100 integrated directly into a high-speed switch 18. In FIG. 7, the interface between the controller device 100 and the switch 18 includes a bus 122) using the appropriate messaging protocol. Examples of appropriate messaging protocols include PCI, Infiniband, Utopia, etc. One advantage of the Switch Blade 120 implementation results from direct access to the internal cross communication fabric 145 in a high-speed switch. This is ideal for communicating between the controller cards 100 as it typically provides extremely low latency and high bandwidth. It is also a convenient interface for driving high-speed networks in the manner described below. In the Switch Blade 120 implementation, communication to the server 12 is either though the switch 18 using protocols such as SCSI over IP (iSCSI) or via a Fiber Channel Network.

In another embodiment, a second form factor (e.g., FIG. 13), the Carrier Class Implementation (CCI) 130, includes multiple controller devices, each residing physically in a rack or chassis 132 that is independent of the network switches 18. A communication port 109 on each controller device provides for communication to a standard high-speed network, such as 10 Gigabit Ethernet, OC192 Sonet, OC768 Sonet, Fiber Channel or Infiniband which is connected to the Wide Area Network (WAN) 14. One advantage of this implementation is that no cooperative development is required with switch manufacturers.

Figure 13:
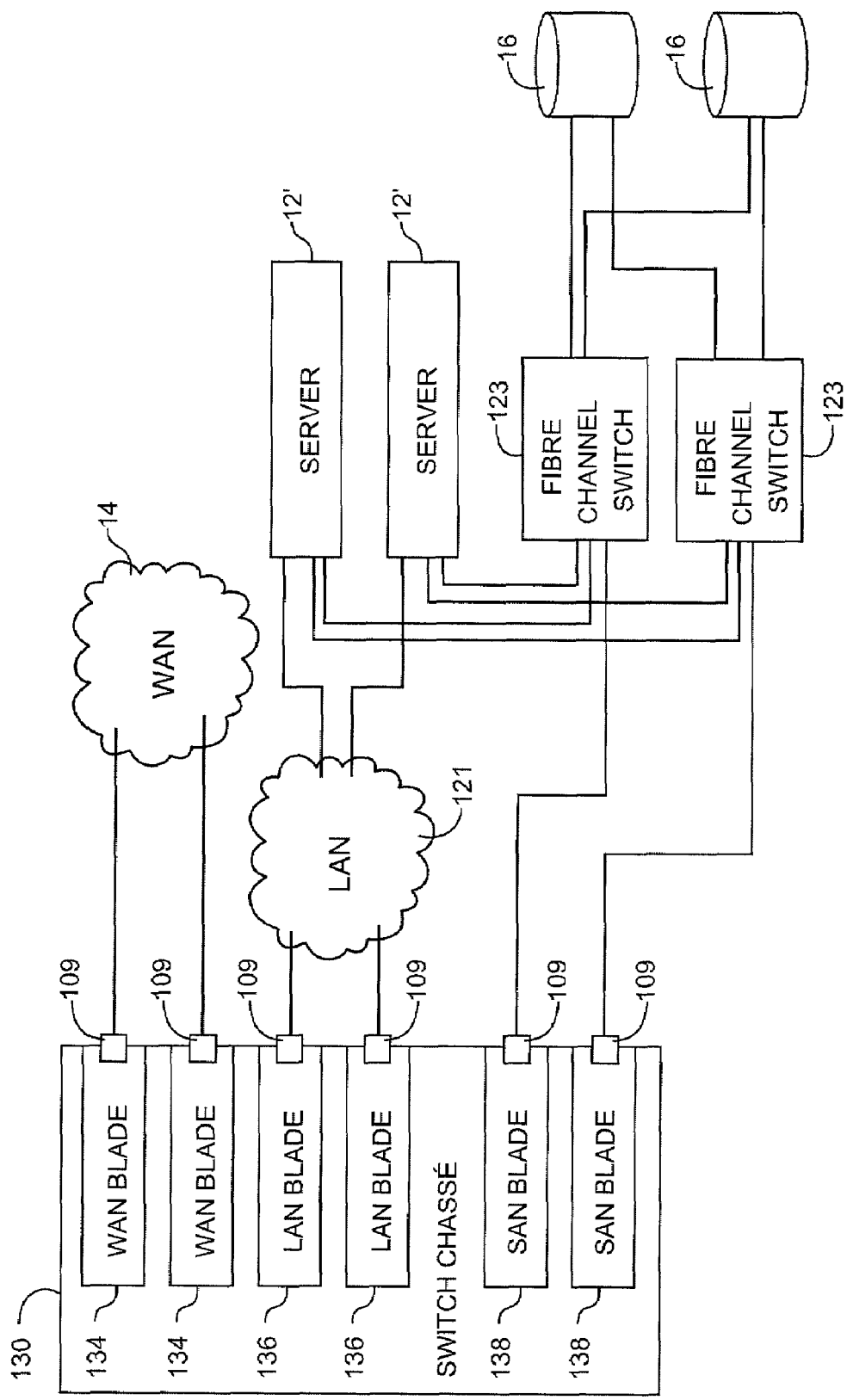
FIG. 13 shows an exemplary configuration of the controller device according to a carrier class configuration according to the present invention.

Referring to FIG. 13, the CCI implementation includes a plurality of controller cards. The controller cards may be connected to different networks depending upon the communication port 109 provided on the controller card. For example, the controller device may include a WAN communication port. The term "WAN Blade" is used to define a controller device 134 that includes at least one communication port 109 for connection to the WAN 14. Similarly, the term "LAN Blade" is used to define a controller device 136 that includes at least one communication port 109 for connection to the LAN 121. The LAN Blade 136 is typically connected to a LAN switch for communication with a server 12. Furthermore, a controller device which is used for connection to the SAN, is defined as a "SAN Blade" 138. The SAN Blade 138 is typically connected to a Fiber Channel (FC) Switch 123 for communication with one or more storage devices 16 such as an array of disks, for example. Both, the WAN Blade 134 and the LAN Blade 136) may be connected by an external server 12' for communication between each other.

It should be apparent to one skilled in the art, that the controller devices of the present invention may include a communication port 109 for connection to other networks, including any proprietary and non-proprietary networks. Also, it is intended to be within the scope of the invention that the controller devices can include more than one communication port 109. Furthermore, a single controller device 100 may include different communication ports 109 for communication to different networks. For example, a single controller device may include a first communication port for communication to a LAN, and a second communication port for communication to a WAN.

Figure 14:
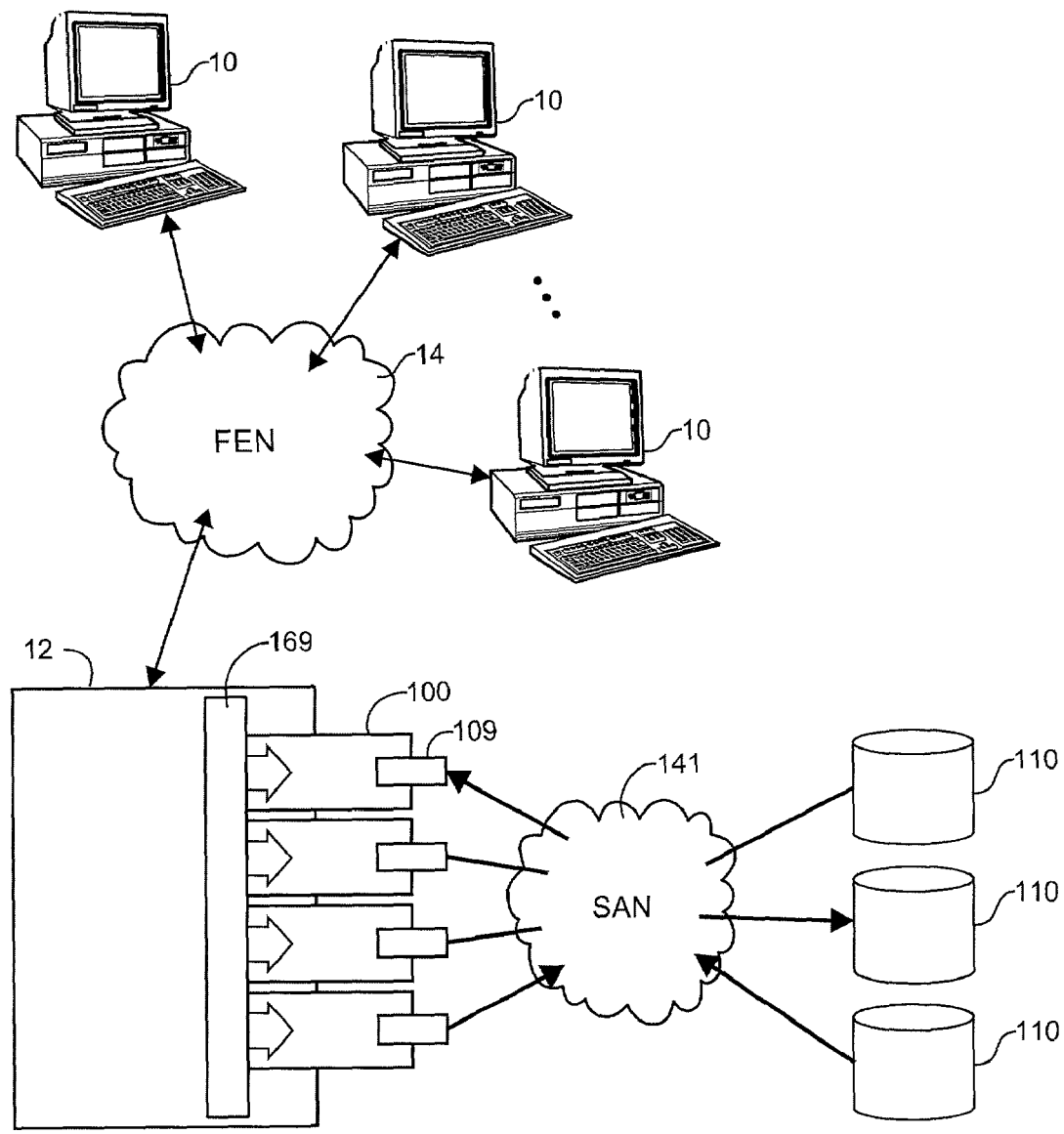
FIG. 14 shows an exemplary configuration of the controller device according to a Host Based Adapter (HBA) configuration according to the present invention.

In another embodiment, yet another form factor, as shown in FIG. 14, the Host Based Adapter (HBA) implementation 140, one or more controller devices 100 reside inside the host or server 12 and are interconnected via the host input/output bus 169, typically a PCI. The interface to the FEN is via ports 109 coupled to the I/O buss 169 via a controller card 100.

At step 300, a request is sent from the client 10 to a controller device 100, or to server 12 communicating with the client 10, over the FEN 14. The messaging protocol 301 is typically an ethernet packet 70, such as an HTTP request. At step 302, the request is received by the controller device 100, or the server 12, and processed. At step 304, a notification message 303 is sent from the server 12, or from controller device 100, to the appropriate controller device 100' on the SAN 141 (e.g., FIG. 14) that is responsible for streaming the required data to the client 10. The controller device 100 or server 12 typically includes an HTTP look-up engine for locating which controller device 100' has the required data.

Models for driving fast data streams include a host controlled model and a controller controlled model. In the Host Controlled model (e.g., FIG. 7), a request for data typically originates from a client 10 and is communicated via the FEN and is directed to a server 12. The server 12 recognizes the request to be a large block of data. Rather than simply reading the data into the server 12 and then transmitting the requested data to the client 10, the server 12 sends a Streaming Data Request (SDR) to the controller device 100. The SDR includes the target address of the client 10, the messaging protocol (such as HTTP, FTP or RTSP), any optional delivery protocol parameters, the virtual volume identifier, the filename of the request, the file offset of the request, and the length of the request. The SDR may optionally also include the delivery encryption method, the delivery encryption key, the delivery compression method, and delivery compression parameters. The data may also be encrypted on the disk subsystem, therefore the SDR may also include the point of presence (POP) encryption key. The SDR is preferably encrypted in untrusted environments and is delivered from the host to a Streaming Manager (SM) running on the controller device 100 via a Remote Procedure Call (RPC) mechanism. If the Streaming Request requires a delivery bandwidth that exceeds the speeds by which data can be extracted from the disk, then the Streaming Manager decomposes the request into a list of disk blocks that must be delivered. These disk blocks are stored on multiple physical disks in a rotating order. This approach is called striping and is commonly used in disk subsystems. Each of the physical disks 110 has independent fiber channel links into the fiber channel network. This allows multiple controller devices 100 to read independent blocks of data in parallel, thereby producing a high aggregate input rate from disk to the collection of controllers. Therefore, the streaming manager sends a number of other controller devices 100 an ordered list of blocks that that controller device 100 have responsibility for in the streaming operation.

Figure 15:
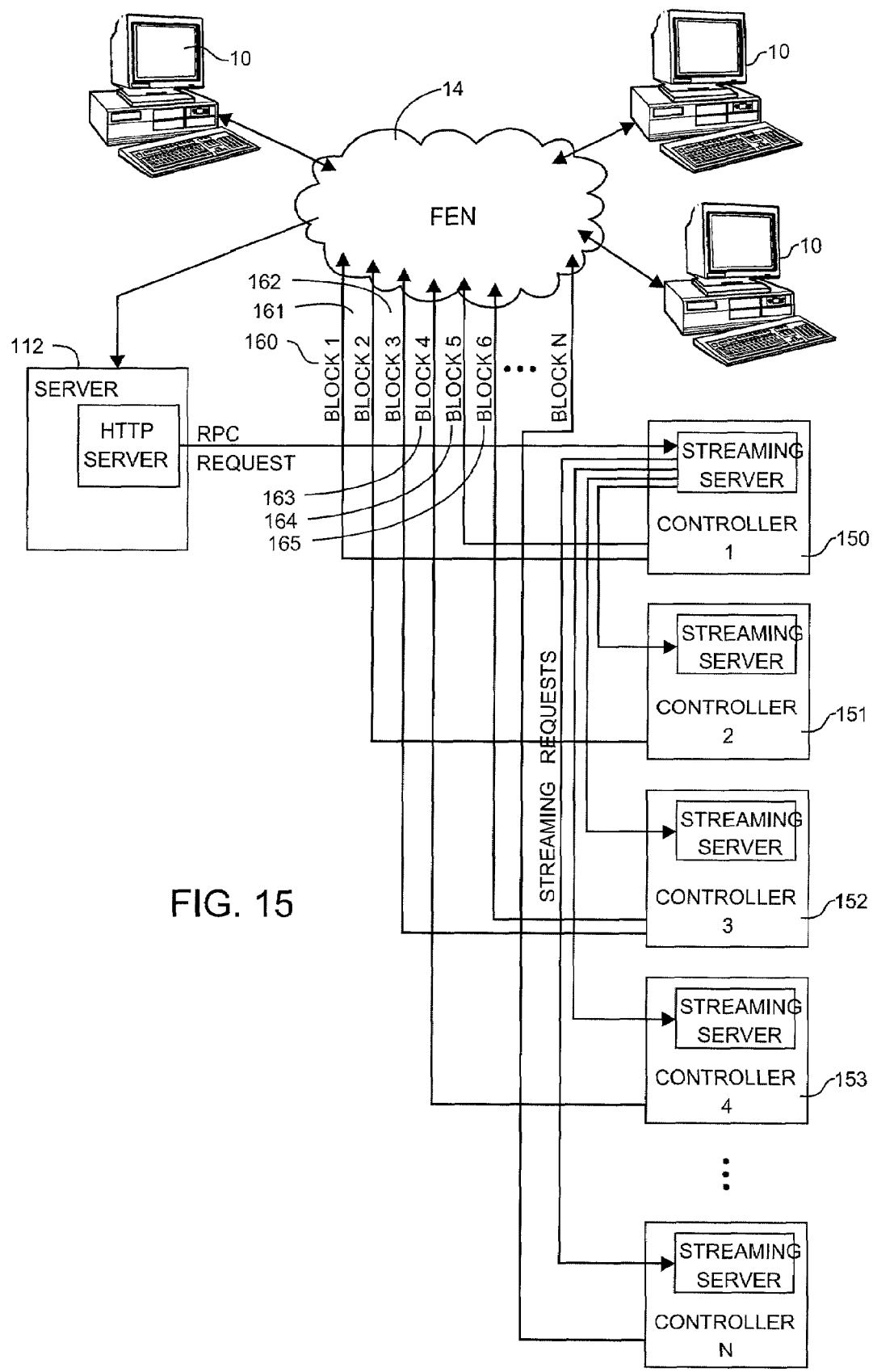
FIG. 15 shows an exemplary configuration of an array of controller devices used in the streaming of data blocks, wherein at least one of the controller devices receives request, such as an HTTP request, from a server and distributes the load of the request across multiple controller devices according to an embodiment of the present invention.

Referring to FIG. 15, for example, each controller device initially reads their initial blocks of data into memory located on the individual controllers. The request to read the data is received from a server 12. Typically, the request may be made from an HTTP Server using an RPC request to the first controller device 150. If decryption from POP, encryption for delivery or compression is required, this is done by each individual controller on the blocks it has read producing a delivery ready block. The first controller 150 then sends its block 160 at the high-speed rates. As soon as the first controller device 150 has finished, a short synchronization message 170 is sent from the first controller 150 to the second controller 151 to start the delivery of the second data block 161. This process is repeated for the array of remaining controller devices 151-153 participating in the streaming process. While the second controller 151 and subsequent controllers 152 and 153 are delivering their data block 162 and 163 to the FEN, the first controller device 151 is reading and applying encryption and decompression operations on the next block in its assigned sequence so that by the time the last controller device, e.g., device 153) in the controller array has delivered its data block to the FEN, the first controller 151 has read, at low speed, the next packet in its list and is ready to deliver the packet at high speed to the FEN. This rotating sequence of writes overlapped with pipelined reads is repeated until all blocks in the SDR are delivered. For example, the first controller device 151 and the second controller device 152 begin streaming the data block 5 164 and data block 6 165 while the third controller devices 152 and the fourth controller device 153 apply encryption to the subsequent data blocks. Data blocks can also be cached in the memory of the controller devices to allow deliver of subsequent requests from other clients without reading from disk, thus increasing the amount of concurrent streaming requests deliverable at any given time.

Referring to FIG. 15, it should be apparent to one skilled in the art that the configuration may include any number, N, of controller devices as well as any configuration of these controller devices within one or more switches for providing the desired I/O stream of data blocks depending upon the client application. As discussed previously, it should also be apparent that many different messaging protocols may be used in the streaming of the data blocks.

Note that the above streaming operation can also be reversed whereby the client writes a large block of data. This requires a single server to be the recipient of the data and to forward it to an array of controller devices for writing to disk. However, given the large size of each cache 104 of FIG. 12B on the controller device in one embodiment (e.g., up to 8 gigabytes per controller device), it is simpler to buffer an incoming write in cache and write it at a more leisurely pace after the fact. The write operation may, however, be mirrored to other controllers to ensure there is no data loss due to controller failure, in which case the process of writing the data to disk can be distributed across multiple controllers. U.S. Pat. No. 6,148,414, which was previously incorporated by reference, provides useful techniques for mirroring to other controllers.

In a Controller Controlled Model (CCM), each of the controller devices executes a request engine, such as Hyper Text Transfer Protocol (HTTP), File Transfer Protocol (FTP), or Real Time Streaming Protocol (RTSP), directly on the controller device. In one embodiment, all requests come from the client directly to a controller device. All such requests are handled by the controller device without server intervention except perhaps requests requiring client authentication (e.g. a password) or requests requiring user executable code (e.g. a cgi/bin request). User executable code generally cannot be allowed to execute on the controller device because it violates the security model by allowing the potential of unauthorized access to the underlying subsystem (hacking). A daemon runs on the server that cooperates with the controller-based request engine via an encrypted socket. Therefore, these types of requests are typically executed on the server and the results returned to the request engine running on the controller device. Large streaming requests are delivered in the FEN using an array of device controllers in the same way as in the Host Controlled model described above.

The communication conduit between server and the controller device described above assumes the Switch Blade implementation. In the Carrier Class implementation, the communication occurs via a control messages delivered via fiber channel packets. In the HBA implementation, a control message to the HBA device driver causes a message to be delivered over the PCI buss. These implementations deliver the same effect as with the Switch Blade implementation.

It should be appreciated that the above implementations also allow streaming to slower networks by deploying only a single controller device per stream, and that requests from multiple clients can be handled simultaneously by a pool of device controllers.

Figure 16:
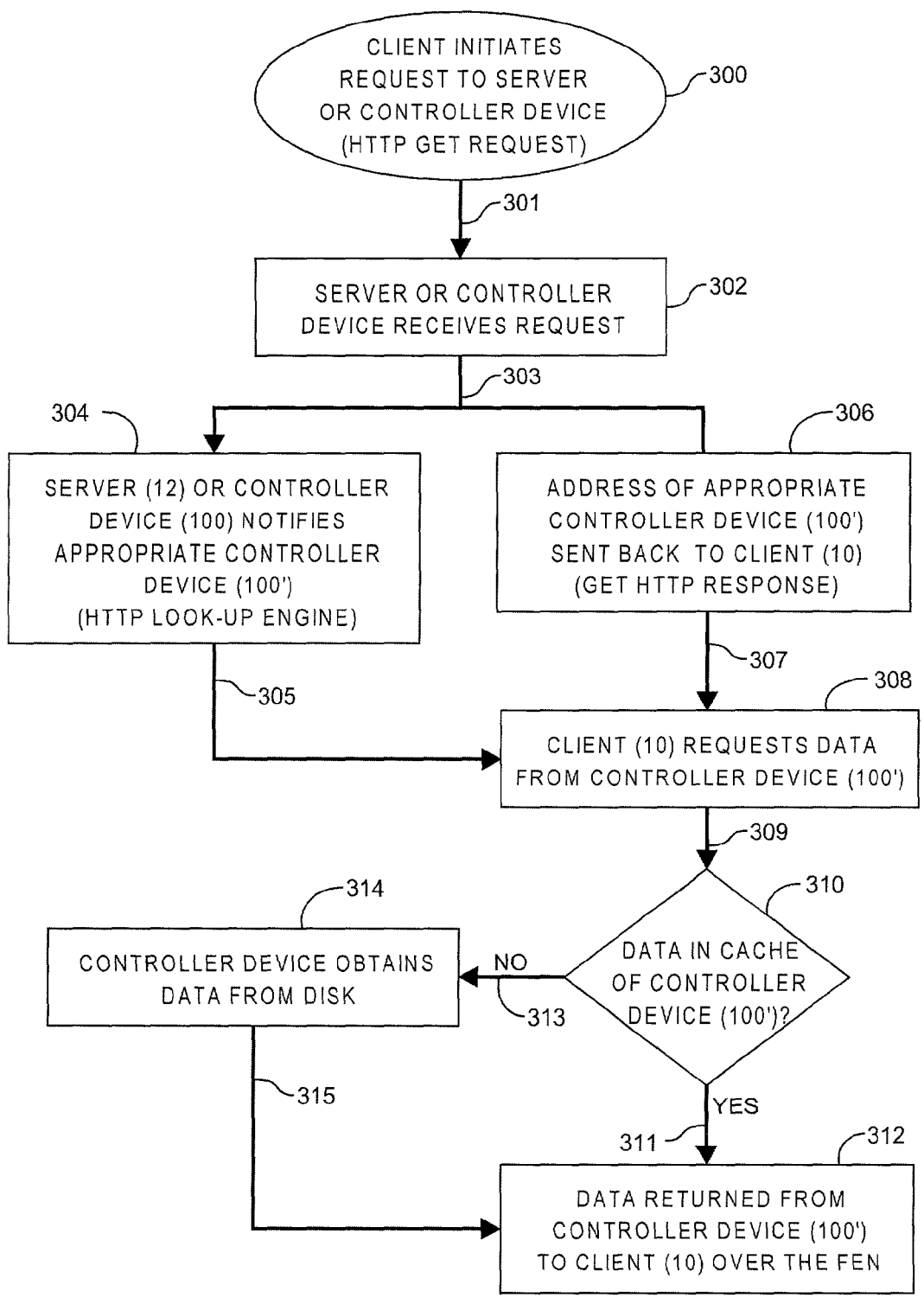
FIG. 16 illustrates a block diagram describing communications that occur between the various nodes on the network for streaming data to the client, in accordance with the present invention.

Referring to FIG. 16, here is shown a block diagram illustrating a process for streaming data to the client, in accordance with an embodiment of the present invention.

At step 300, a request is sent from the client 10 to a controller device 100, or to server 12 communicating with the client 10, over the FEN 14. The messaging protocol 301 is typically an ethernet packet 70, such as an HTTP request. At step 302, the request is received by the controller device 100, or the server 12, and processed. At step 304, a notification message 303 is sent from the server 12, or from controller device 100, to the appropriate controller device 100' on the SAN 141 that is responsible for streaming the required data to the client 10. The controller device 100 or server 12 typically includes an HTTP look-up engine for locating which controller device 100' has the required data.

Figure 17A:
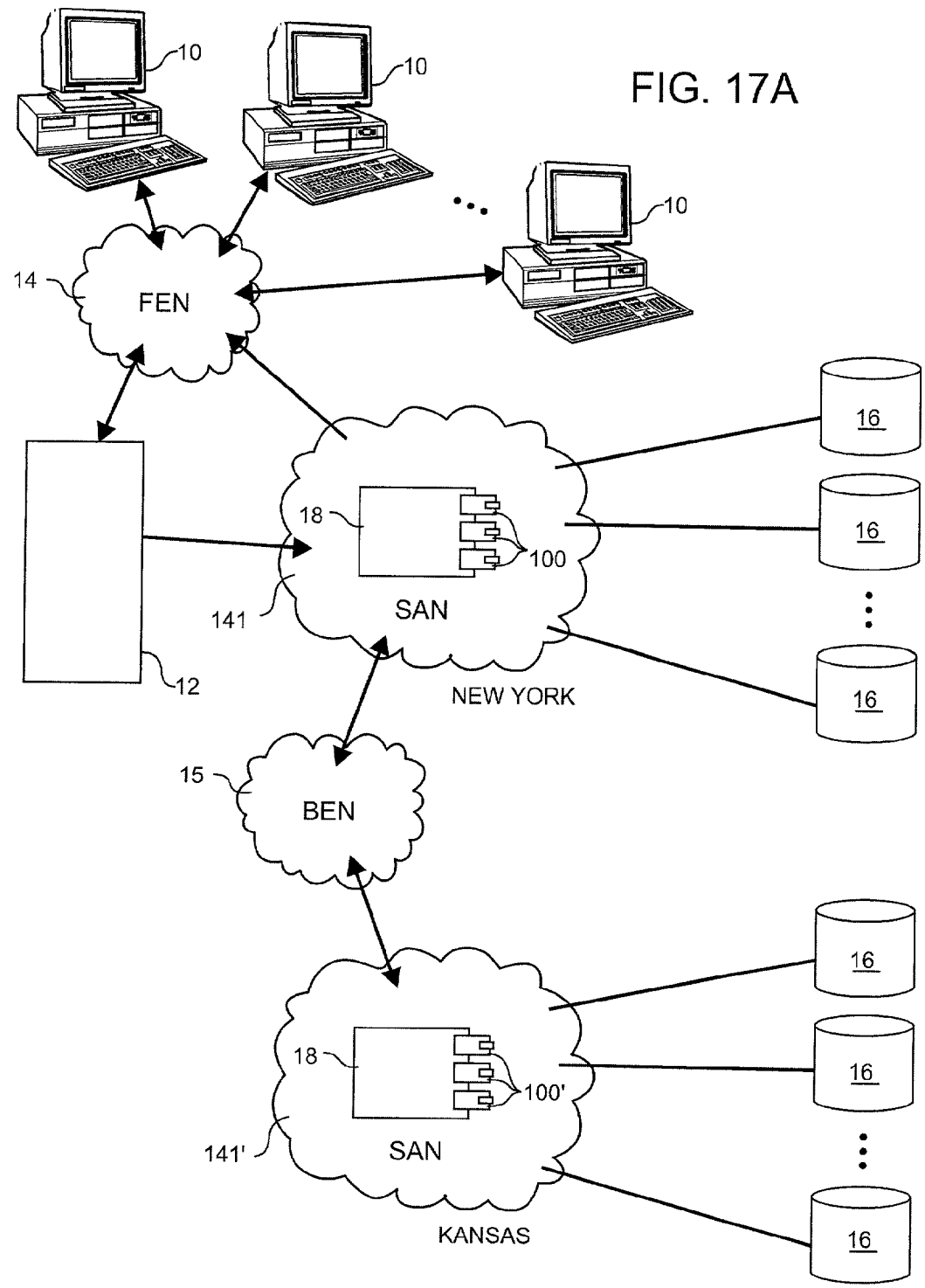
FIG. 17A illustrates an embodiment of the invention, according to step 304 of FIG. 16 in which the server 12 communicates with a controller device 100' which is located on another SAN 141' through a mitigating controller card 100 located on SAN 141 over a BEN 15.

Referring to FIG. 17A, according to an embodiment for the invention, at step 304, the controller device 100, or the server 12, communicates with the controller device 100' which is located on another SAN 141'. The server 12 typically forwards the notification message 303 over a Back-End Network (BEN) 15 which is connected to the SAN 141'. The BEN 15 may include a FEN 14, but is distinguishable by the original FEN 14 in that the BEN 15 may be geographically separated from the FEN 14. For example the FEN 14 may be located in the continent of North America wherein the BEN 15 may be in Europe. The communication interconnect between the two networks may include an optical fiber, for example, but may be comprised of other mediums.

Referring to FIG. 17B, in one embodiment of the invention, at step 304, a receiving controller device 100 located on a SAN 141 communicates with a controller device 100' which is located on another SAN 141'. The controller device 100 forwards the notification message 303 over a Back-End Network (BEN) 15 which is connected to the SAN 141'. The BEN 15 may include a FEN 14, but is distinguishable from the original FEN 14 in that the BEN 15 may be geographically separated from the FEN 14. For example the FEN 14 may be located in the continent of North America wherein the BEN 15 may be in Europe. The communication interconnect between the two network may include an optical fiber, for example, but may be comprised of other mediums.

At step 306, the request sent to the server (12 or controller device 100 is answered and sent back to the client 10 requesting the data 82. The message 307 is typically an ethernet packet 70, such as an HTTP request. Step 306 may occur concurrently with step 304, or may be controlled to occur after the appropriate controller device 100' is notified by signal message 305.

At step 308, the client 10 sends a request to the controller device 100'. The message 307 is typically an ethernet packet 70, such as an HTTP request. The message 307 is similar to message 301 of step 300, except with the address of the appropriate controller device 100' designated during step 304. At step 310, the controller device 100' determines whether the requested data 82 is present in cache 104. At step 314, if the requested data 82 is not present in cache 104 then a data 82 request message 313 for the data 82 is sent to the appropriate substorage device such as an array of disks 16. Otherwise, at step 312 the requested data 82 is streamed back to the requesting client by the controller device 100'.

As discussed previously, the control device 100 or server 12 sends an RPC request to the controller device 100' during step 304. The request is typically an RPC request, as disclosed previously. The controller device 100' may be received by a first controller device 100' which forwards the request to other controller device 100'. An array of controller devices 100 and 100' may be used to complete the streaming operation.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, although the controller devices of the present invention are typically implemented in switches as described, it should be apparent that the controller devices may be implemented in routers/bridges, et cetera. Additionally, it should be apparent to one skilled in the art that the present invention is useful for handling compressed or uncompressed video information and other continuous media information like streaming audio, for example. Different audio or video information could be compressed at different rates. For example, music may be compressed at a higher bit rate (lower compression ratio) than voice conversation. A continuous media stream could also consist of several streams of different media types multiplexed together. Therefore, the scope of the appended claims should be accorded the broadest interpretation so as to encompass all such modifications and similar arrangements.

What is claimed is:

1. A method of delivering streaming data content to a client device from two or more controller devices over a data communication network in response to a request for the data content from the client device, wherein the data content includes two or more blocks of data stored on a storage system, the method comprising:

receiving, by a server, a request from a first client device over the data communication network, the request identifying streaming data content stored on a storage system;

transmitting a data request message from the server to a first controller device associated with the storage system, the data request message identifying the first client device and the data content requested by the first client device;

retrieving a first block of the data content from the storage system by the first controller device;

sending a second data request message from the first controller device to a second controller device associated with the storage system, the second data request message identifying the first client device and a second block of the data content;

retrieving the second block of the data content from the storage system by the second controller device;

transferring the first block of data to the first client device from the first controller device;

sending a synchronization message from the first controller device to the second controller device; and in response to the synchronization message, transferring the second block of data to the first client device from the second controller device over a communication path that does not include the first controller device, wherein the first and second controller devices transfer the first and second data blocks over the data communication network at a faster rate than the rate at which the first and second data blocks are retrieved from the storage system.

2. The method of claim 1, wherein the first and second controller devices are located in geographically remote locations relative to each other.

3. The method of claim 1, wherein the first and second controller devices communicate over a second data communication network different from the data communication network.

4. The method of claim 1, wherein the server communicates with the first controller device over the data communication network.

5. The method of claim 1, wherein the second controller communicates with the first client device over the data communication network.

6. The method of claim 1, wherein the second controller device communicates with the storage system over a storage area network.

7. The method of claim 1, wherein the steps of retrieving the data blocks, each include reading the data block from the storage system and applying one of an encryption and a decompression algorithm to the read data block.

8. The method of claim 1, wherein the first and second controller devices are communicably coupled over a bus.

9. The method of claim 1, wherein the first and second controller devices are communicably coupled over a storage area network.

10. The method of claim 1, wherein the first and second controller devices are communicably coupled to the storage system over a storage area network.

11. The method of claim 1, wherein the first controller device communicates with the storage system over a storage area network.

12. The method of claim 1, wherein the first controller device is located in a network switch device coupled to the data communication network.

* * * * *